United States Patent
Minakuchi et al.

(10) Patent No.: US 11,483,899 B2
(45) Date of Patent: Oct. 25, 2022

(54) NETWORK SYSTEM THAT PROCESSES DATA GENERATED BY DATA GENERATION DEVICE, COMMUNICATION CONTROL DEVICE, AND COMMUNICATION CONTROL METHOD

(71) Applicant: FUJITSU LIMITED, Kawasaki (JP)

(72) Inventors: Yu Minakuchi, Yokohama (JP); Hideyuki Matsuda, Atsugi (JP); Jo Sugino, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 17/095,186

(22) Filed: Nov. 11, 2020

(65) Prior Publication Data

US 2021/0212162 A1  Jul. 8, 2021

(30) Foreign Application Priority Data

Jan. 6, 2020 (JP) .............................. JP2020-000186

(51) Int. Cl.
*H04W 84/18* (2009.01)
*H04W 40/02* (2009.01)
*H04W 40/28* (2009.01)

(52) U.S. Cl.
CPC ........... *H04W 84/18* (2013.01); *H04W 40/02* (2013.01); *H04W 40/28* (2013.01)

(58) Field of Classification Search
CPC ..... H04W 84/18; H04W 40/02; H04W 40/28; H04L 41/5051; H04L 45/302; H04L 45/306; H04L 47/2416; H04L 47/28; H04L 41/0803
See application file for complete search history.

(56) References Cited

U.S. PATENT DOCUMENTS

| | | | |
|---|---|---|---|
| 6,996,129 B2 * | 2/2006 | Krause | H04N 21/2405 370/487 |
| 2016/0156513 A1 | 6/2016 | Zhang et al. | |
| 2018/0227221 A1 * | 8/2018 | Starsinic | H04L 45/306 |
| 2018/0227244 A1 * | 8/2018 | Zhang | H04L 43/08 |
| 2018/0337823 A1 | 11/2018 | Zhang et al. | |

FOREIGN PATENT DOCUMENTS

| | | |
|---|---|---|
| JP | 2016-086225 A | 5/2016 |
| JP | 2018-500817 A | 1/2018 |

* cited by examiner

*Primary Examiner* — Jamal Javaid
*Assistant Examiner* — Shawn D Miller
(74) *Attorney, Agent, or Firm* — ArentFox Schiff LLP

(57) ABSTRACT

A communication control device that controls a plurality of communication devices in a network system includes: a receiver, a processor and a transmitter. The receiver receives a request pertaining to use of data generated by the data generation device from a user device. The processor determines a route between the data generation device and the user device, specifies first and second communication devices that are implemented at both ends of an overlapped route between a first route corresponding to a first request and a second route corresponding to a second request, and determines, based on the first request and the second request, a function to be executed by at least one of the first and second communication devices. The transmitter transmits an instruction including information for identifying the function determined by the processor to at least one of the first and second communication devices.

7 Claims, 23 Drawing Sheets

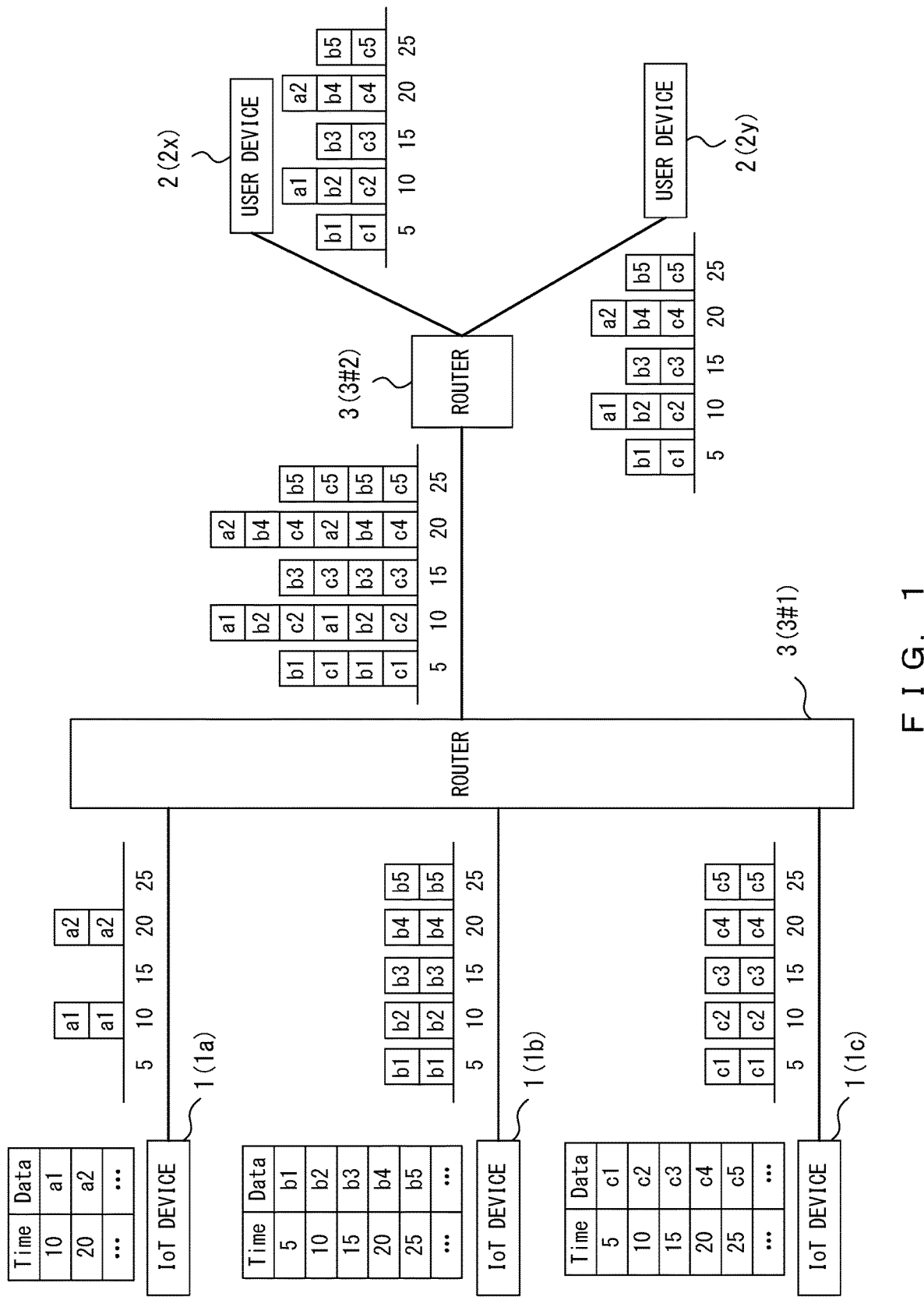
F I G. 1

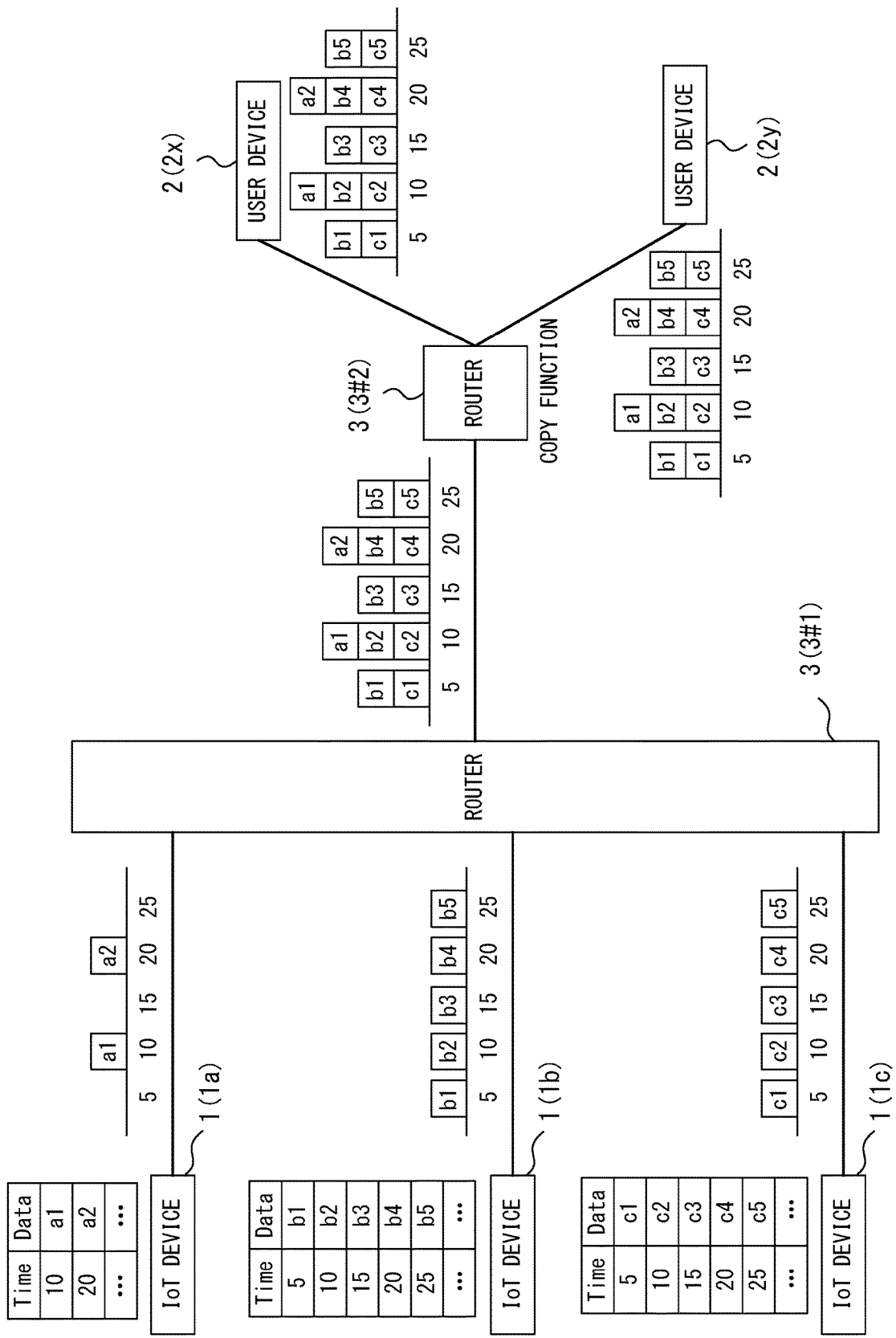
F I G. 2

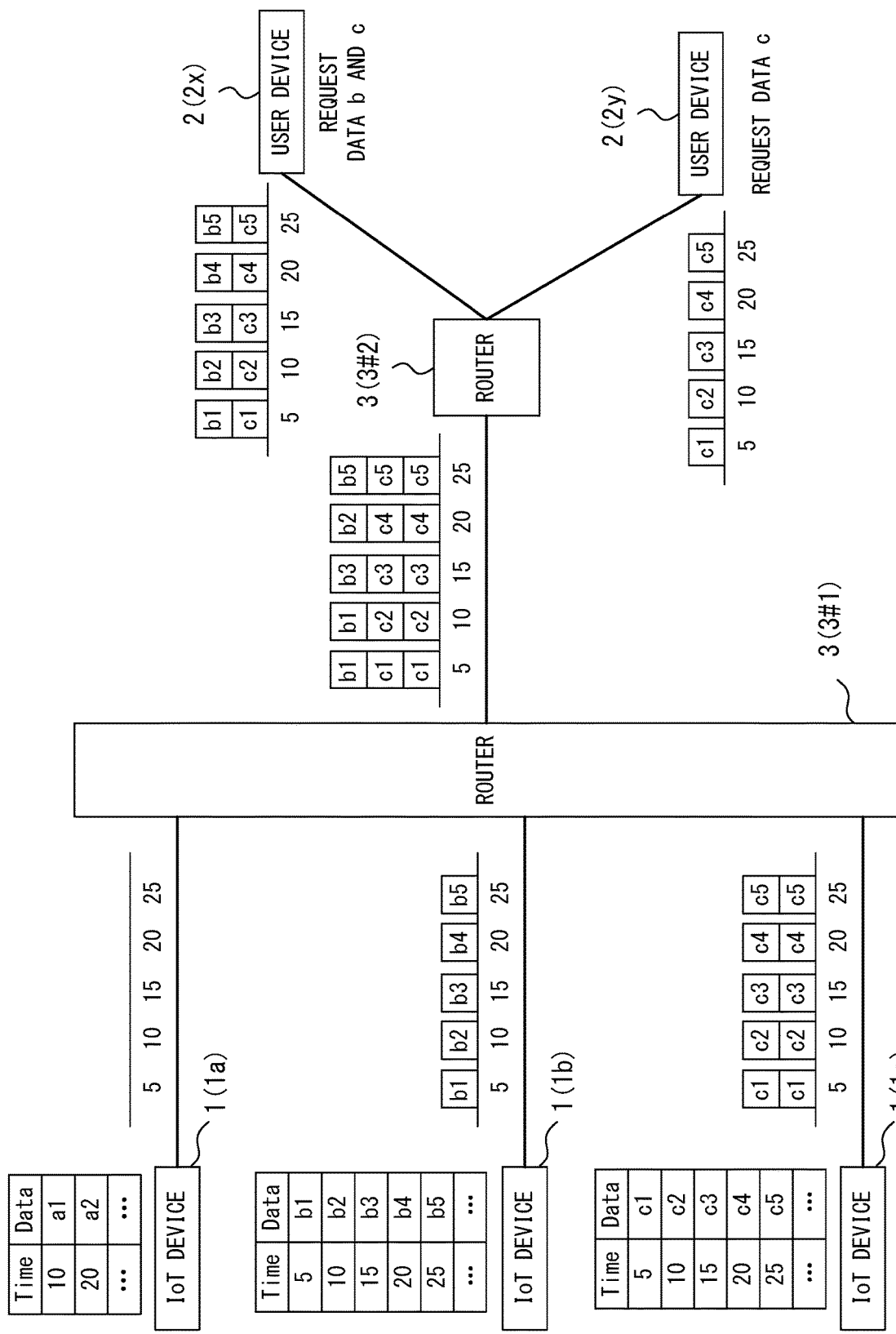
F I G. 3

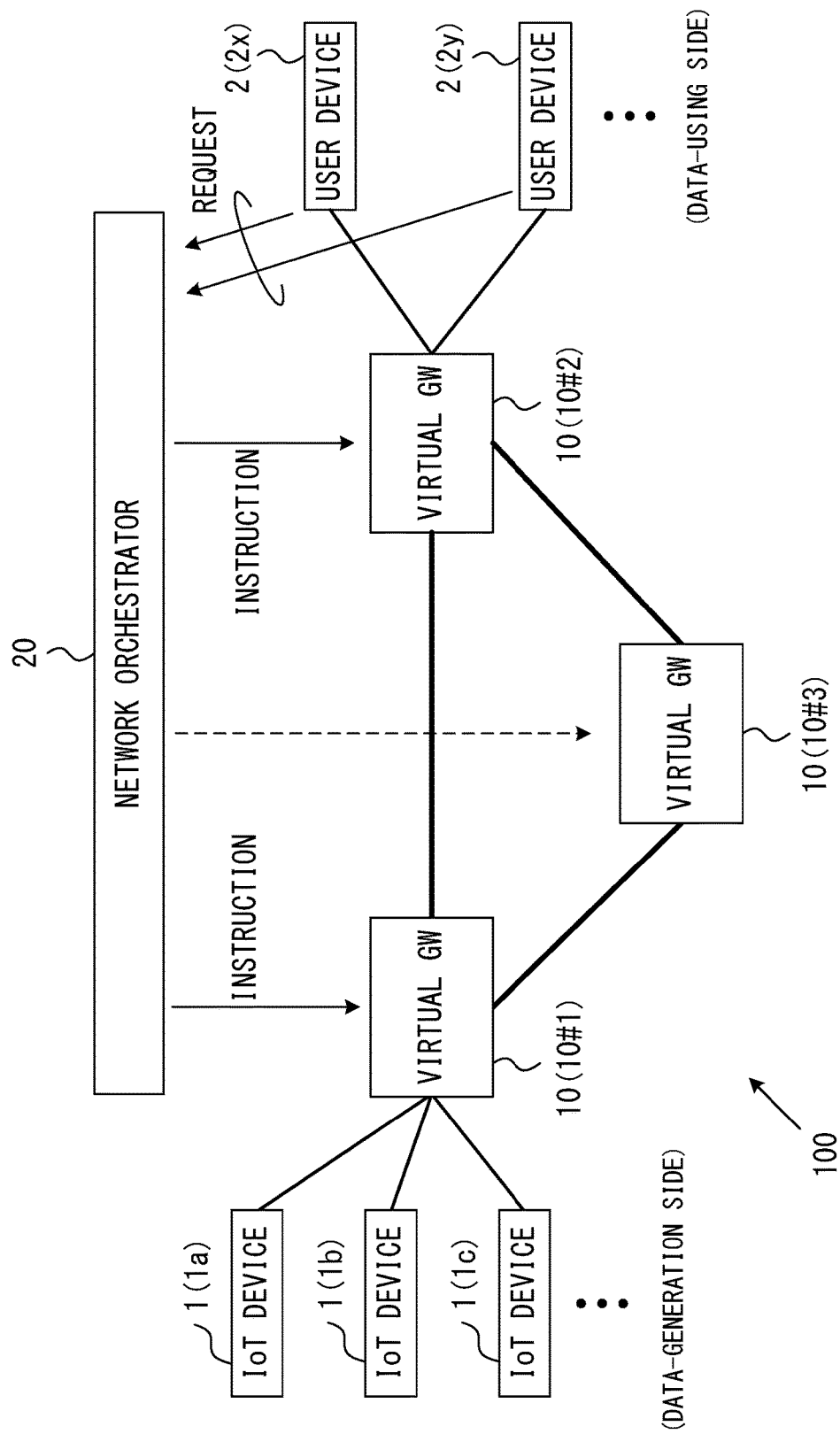
F I G. 4

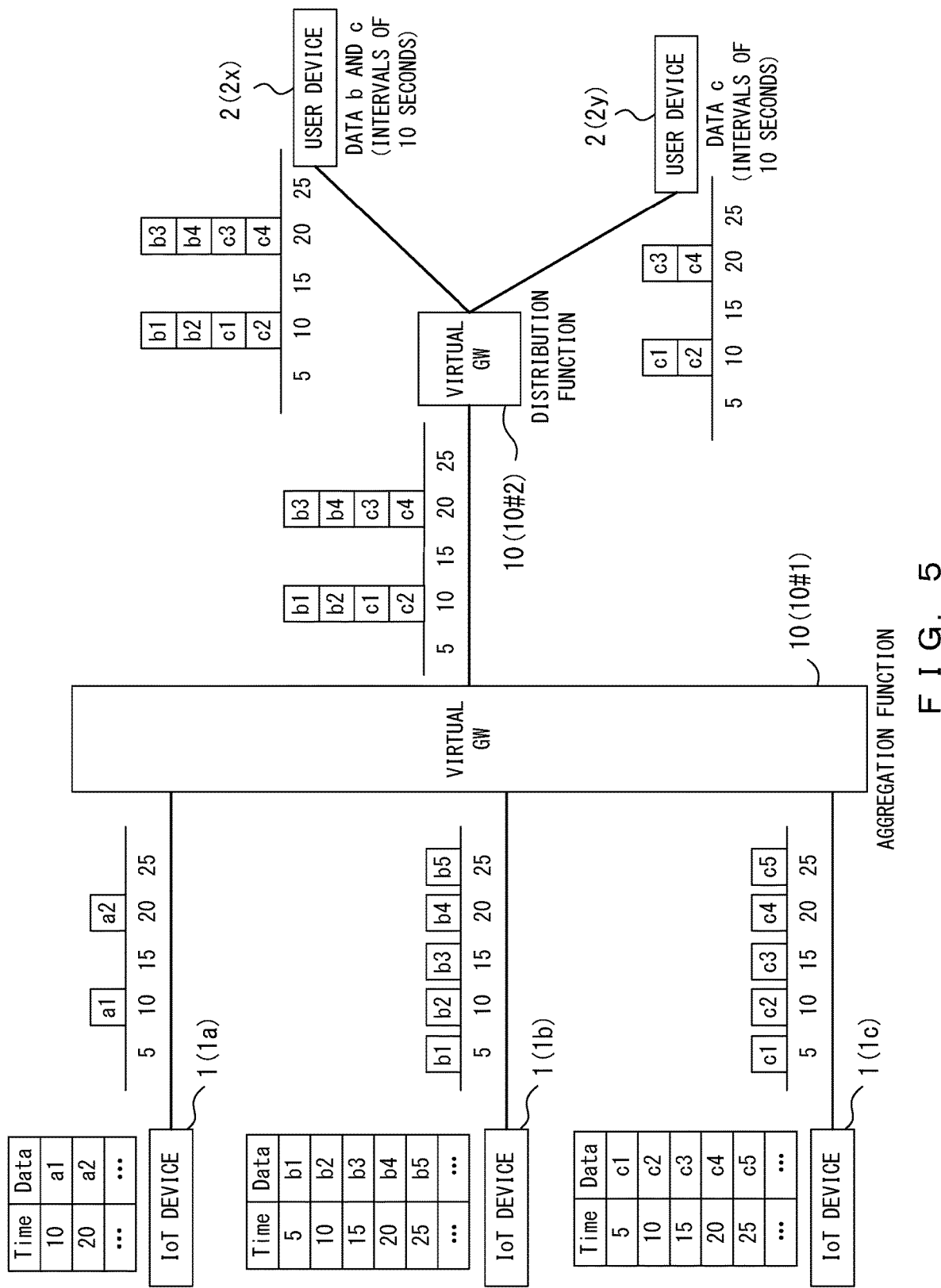
F I G. 5

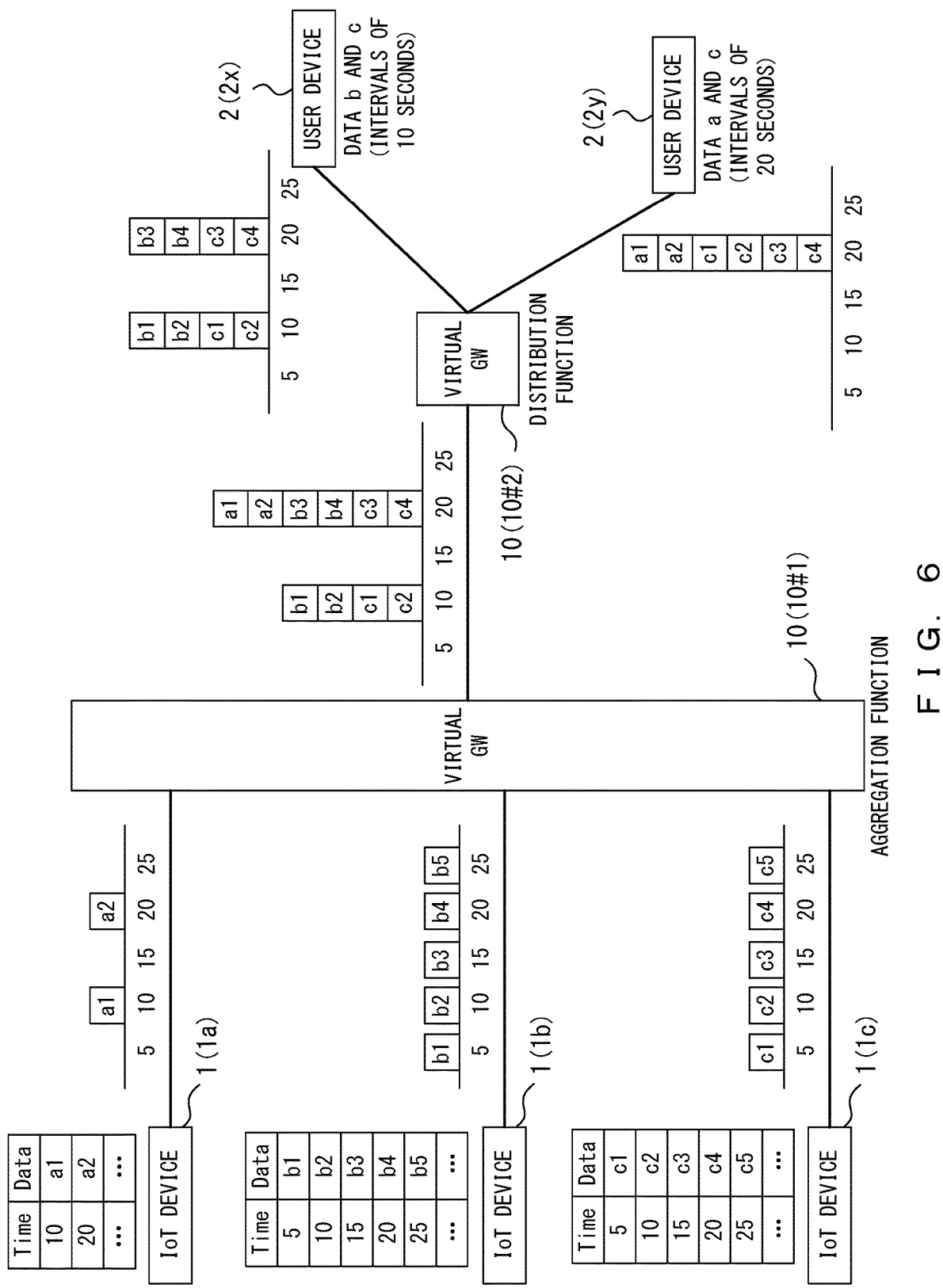
F I G. 6

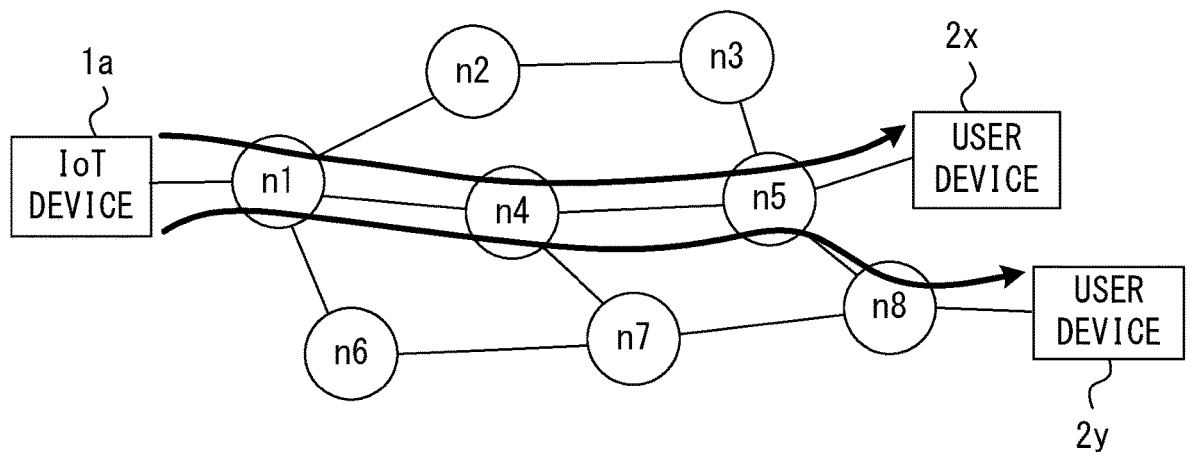
F I G. 10

FIG. 11A

| IoT DEVICE | | | VIRTUAL GW | |
|---|---|---|---|---|
| ID | ADDRESS | TRANSMISSION INTERVAL | ID | ADDRESS |
| 1a | 10.10.10.1 | 10 | 10#1 | 10.10.20.1 |
| 1b | 10.10.10.2 | 5 | 10#1 | 10.10.20.1 |
| 1c | 10.10.10.3 | 5 | 10#1 | 10.10.20.1 |

FIG. 11B

| GENERATION-SIDE VIRTUAL GW | | USER-SIDE VIRTUAL GW | |
|---|---|---|---|
| ID | ADDRESS | ¥ID | ADDRESS |
| 10#1 | 10.10.20.10 | 10#2 | 10.10.30.10 |

FIG. 11C

| VIRTUAL GW | | USER DEVICE | |
|---|---|---|---|
| ID | ADDRESS | ID | ADDRESS |
| 10#2 | 10.10.30.1 | 2x | 10.10.40.1 |
| 10#2 | 10.10.30.1 | 2y | 10.10.40.2 |

| GW | FUNCTION |
|---|---|
| 10#1 | AGGREGATION, MOTION EXTRACTION, ⋯ |
| 10#2 | DISTRIBUTION, EMPTY/FULL DECISION, ⋯ |

| REQUEST ID | IoT DEVICE | GENERATION-SIDE VIRTUAL GW | USER-SIDE VIRTUAL GW | USER DEVICE | RECEPTION INTERVAL |
|---|---|---|---|---|---|
| 001_01 | 1b(DATA b) | 10#1 | 10#2 | 2x | 10 |
| 001_02 | 1c(DATA c) | 10#1 | 10#2 | 2x | 10 |
| 002 | 1c(DATA c) | 10#1 | 10#2 | 2y | 10 |

FIG. 13B

| REQUEST ID | IoT DEVICE | GENERATION-SIDE VIRTUAL GW | USER-SIDE VIRTUAL GW | USER DEVICE | RECEPTION INTERVAL |
|---|---|---|---|---|---|
| 001_01 | 1b(DATA b) | 10#1 | 10#2 | 2x | 10 |
| 001_02 | 1c(DATA c) | 10#1 | 10#2 | 2x | 10 |
| 002_01 | 1c(DATA c) | 10#1 | 10#2 | 2y | 20 |
| 002_02 | 1a(DATA a) | 10#1 | 10#2 | 2y | 20 |

F I G. 1 4 A

| IoT DEVICE | GENERATION-SIDE VIRTUAL GW | | USER-SIDE VIRTUAL GW | | |
| --- | --- | --- | --- | --- | --- |
| | FUNCTION | PARAMETER | FUNCTION | FORWARDING DESTINATION | PARAMETER |
| 1a | AGGREGATION | 0 (DISCARD) | – | – | – |
| 1b | AGGREGATION | 10 | DISTRIBUTION | 2x | 10 |
| 1c | AGGREGATION | 10 | DISTRIBUTION | 2x | 10 |
| | | | | 2y | 10 |

F I G. 1 4 B

| IoT DEVICE | GENERATION-SIDE VIRTUAL GW | | USER-SIDE VIRTUAL GW | | |
| --- | --- | --- | --- | --- | --- |
| | FUNCTION | PARAMETER | FUNCTION | FORWARDING DESTINATION | PARAMETER |
| 1a | AGGREGATION | 20 | DISTRIBUTION | 2y | 20 |
| 1b | AGGREGATION | 10 | DISTRIBUTION | 2x | 10 |
| 1c | AGGREGATION | 10 | DISTRIBUTION | 2x | 10 |
| | | | | 2y | 20 |

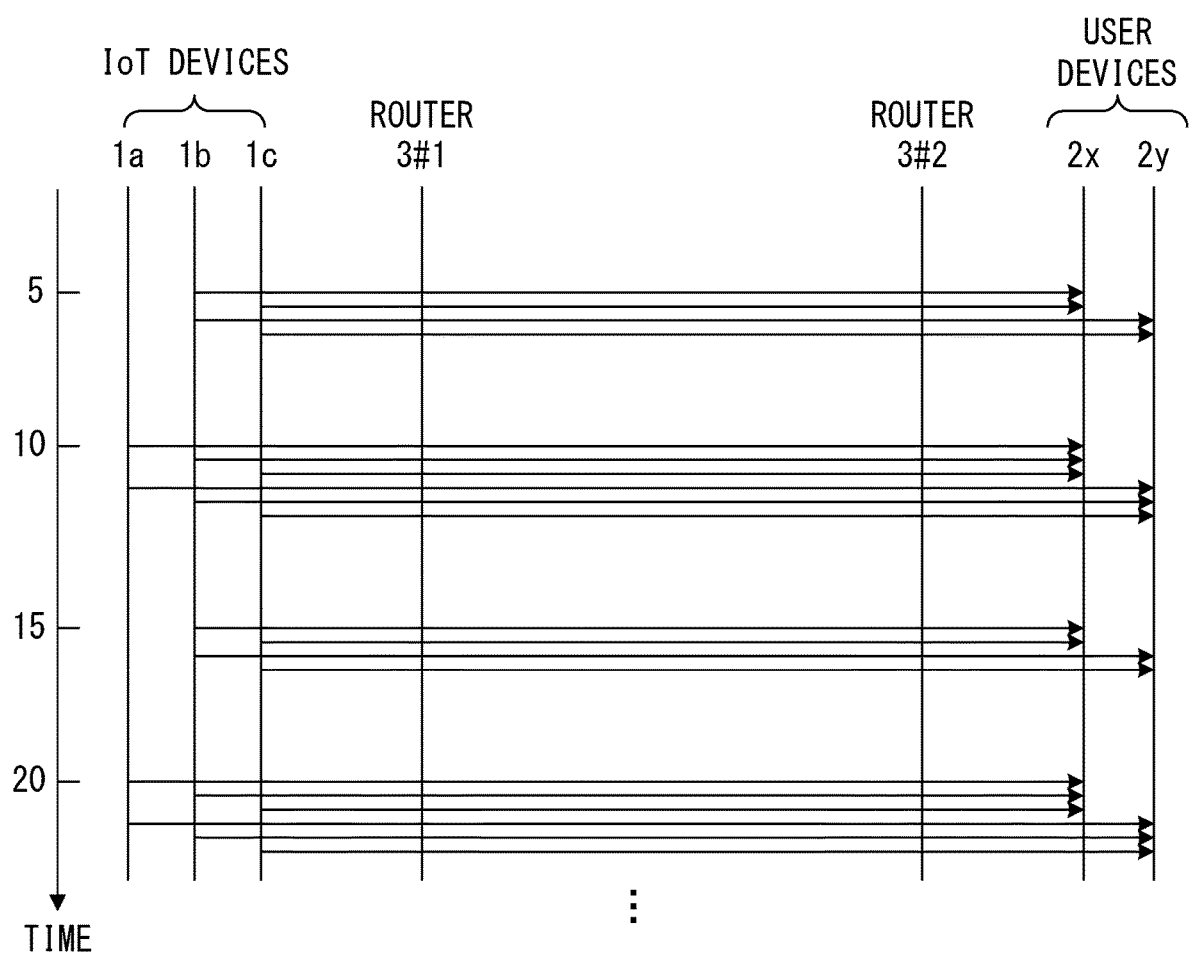
F I G. 1 7

FIG. 21A

| REQUEST ID | IoT DEVICE | GENERATION-SIDE VIRTUAL GW | USER-SIDE VIRTUAL GW | USER DEVICE | NEEDED INFORMATION |
|---|---|---|---|---|---|
| 001 | 1a | 10#1 | 10#2 | 2x | VIDEO DATA INCLUDING "MOTION" |
| 002 | 1a | 10#1 | 10#2 | 2y | EMPTY/FULL INFORMATION |

FIG. 21B

| IoT DEVICE | GENERATION-SIDE VIRTUAL GW | | USER-SIDE VIRTUAL GW | | |
|---|---|---|---|---|---|
| | FUNCTION | PARAMETER | FUNCTION | FORWARDING DESTINATION | PARAMETER |
| 1a | MOTION EXTRACTION | VIDEO DATA INCLUDING "MOTION" | FORWARDING | 2x | — |
| | | | EMPTY/FULL DECISION | 2y | — |

NETWORK SYSTEM THAT PROCESSES DATA GENERATED BY DATA GENERATION DEVICE, COMMUNICATION CONTROL DEVICE, AND COMMUNICATION CONTROL METHOD

CROSS-REFERENCE TO RELATED APPLICATION

This application is based upon and claims the benefit of priority of the prior Japanese Patent Application No. 2020-000186, filed on Jan. 6, 2020, the entire contents of which are incorporated herein by reference.

FIELD

The embodiments discussed herein are related to a network system that processes data generated by a data generation device, a communication control device, and a communication control method.

BACKGROUND

In recent years, many Internet-of-Things (IoT) devices have been connected to networks. For example, monitoring cameras and weather sensors may be connected to a network. In this case, video data, weather data, and the like are transmitted over the network. The number of IoT devices connected to networks are expected to further increase in the future as well. Thus, technologies for reducing network congestion have been studied.

However, considering costs, installation spaces, power consumption, and the like, a method that physically increases network resources will not be preferable. Thus, methods that use existing network resources efficiently have been proposed. For example, a proposed method is one wherein when a load on a gateway device is greater than a specified threshold, a virtual machine is additionally provided, and terminals to be dealt with by a gateway device operated on the additionally provided virtual machine are determined (e.g., Japanese Laid-open Patent Publication No. 2016-086225). Another proposed method is one wherein a service customized virtual network is created in accordance with service requirement data (e.g., Japanese National Publication of International Patent Application No. 2018-500817).

The use efficiency of network resources is not necessarily sufficiently high in the prior art. For example, a method for optimizing the use efficiency of resources for the entirety of a network has not been proposed yet.

SUMMARY

According to an aspect of the embodiments, a network system processes data generated by a data generation device. The network system includes a plurality of communication devices and a communication control device that controls the plurality of communication devices. The communication control device includes: a receiver, a processor and a transmitter. The receiver receives a request pertaining to use of data generated by the data generation device from a user device. The processor determines a route between the data generation device pertaining to the request received by the receiver and the user device, specifies a first communication device and a second communication device that are implemented at both ends of an overlapped route that is an overlap between a first route corresponding to a first request and a second route corresponding to a second request, and determines, based on the first request and the second request, a function to be executed by at least one of the first communication device and the second communication device. The transmitter transmits an instruction including information for identifying the function determined by the processor to at least one of the first communication device and the second communication device. At least one of the first communication device and the second communication device processes data corresponding to the first request and the second request based on the instruction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1-3 illustrate examples of methods for transmitting IoT data;

FIG. 4 illustrates an example of a network system in accordance with embodiments of the present invention;

FIG. 5 illustrates an example of a data processing method using virtual gateways and a network orchestrator;

FIG. 6 illustrates another example of a data processing method using virtual gateways and a network orchestrator;

FIG. 10 illustrates an example of a process performed by a route determination unit and a gateway specifying unit;

FIGS. 11A-11C illustrate examples of a connection information management table;

FIG. 12 illustrates an example of a gateway function management table;

FIGS. 13A and 13B illustrate examples of a user request management table;

FIGS. 14A and 14B illustrate examples of a data processing management table;

FIG. 17 illustrates an example of a sequence of data processing using a conventional router;

FIGS. 21A and 21B illustrate examples of a user request management table and a data processing management table;

DESCRIPTION OF EMBODIMENTS

Figure 7:
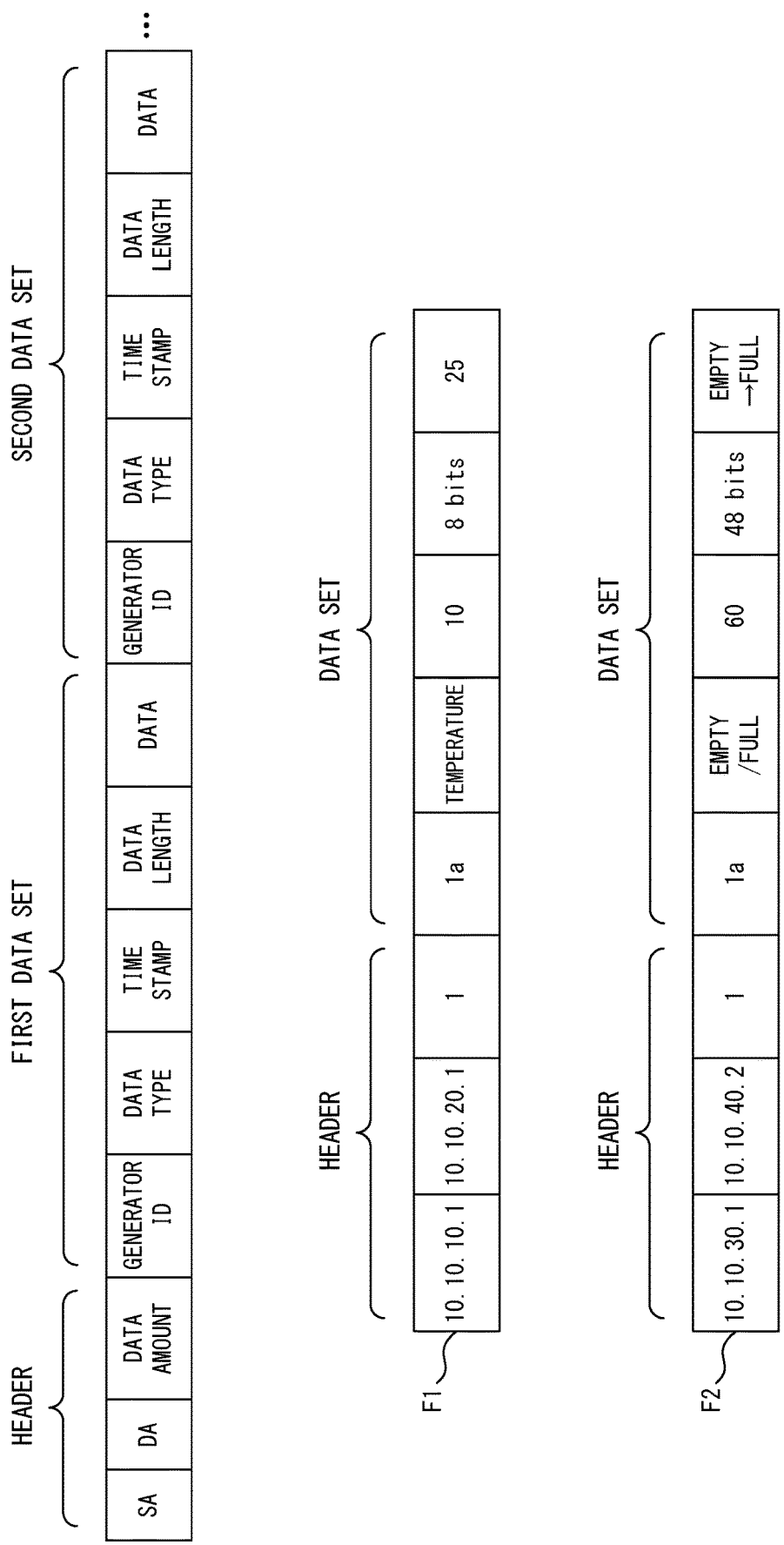
FIG. 7 illustrates an example of the format of a data frame.

FIGS. 1-3 illustrate examples of methods for transmitting IoT data. In these examples, IoT data generated by IoT devices 1 (1a-1c) is transmitted to user devices 2 (2x-2y) via routers 3. For example, the IoT device 1 may be a monitoring camera. In this case, the IoT device 1 generates and outputs video data. Alternatively, the IoT device 1 may be a sensor. In this case, the IoT device 1 generates and outputs sensor data.

The IoT device 1a outputs IoT data at intervals of ten seconds. That is, the IoT device 1a outputs data a1, data a2, . . . at time 10, time 20 . . . , respectively. The IoT devices 1b and 1c each output IoT data at intervals of five seconds. That is, the IoT device 1b outputs data b1, data b2, data b3, . . . at time 5, time 10, time 15 . . . , respectively. Similarly, the IoT device 1c outputs data c1, data c2, data c3, . . . at time 5, time 10, time 15 . . . , respectively.

In the example depicted in FIG. 1, each of the IoT devices 1 transmits IoT data to the user devices 2. For example, the IoT device 1a transmits data a to the user device 2x and also transmit data a to the user device 2y. A router 3 #1 multiplexes pieces of IoT data output from the IoT devices 1a-1c. The IoT data multiplexed by the router 3 #1 is transmitted to a router 3 #2 accommodating the user devices 2x and 2y. The router 3 #2 demultiplexes the IoT data received from the router 3 #1 for each of the user devices. Each piece of IoT data is forwarded to the user devices 2x and 2y. Each of the user devices 2x and 2y acquires desired data from the received data. However, in this method, the same data is redundantly transmitted to each user device, and hence the use efficiency of network resources is low.

In the example depicted in FIG. 2, the router 3 has a function for copying data. In this case, when a plurality of user devices receive the same data, each of the IoT devices 1 does not redundantly transmit the same data to each of the user devices. The router 3 #2 copies and forwards received data to the plurality of user devices 2. As a result, each of the user devices 2x and 2y can acquire desired data, as in the case depicted in FIG. 1. In this method, the same data is not redundantly transmitted, and hence the use efficiency of network resources is improved in comparison with the method depicted in FIG. 1. However, even this method has room for further improvement of the use efficiency because data that is not desired by a user could be transmitted. For example, the user of the user device 2x may need data from the IoT device 1b, and the user of the user device 2y may need data from the IoT device 1c. In this case, the data from the IoT device 1a is not needed but is transmitted from the router 3 #1 to the router 3 #2.

In the example depicted in FIG. 3, each of the user devices 2 sends a data transmission request to an IoT device 1 that generates desired data. For example, the user device 2x may send a data transmission request to the IoT devices 1b and 1c, and the user device 2y may send a data transmission request to the IoT device 1c. In this case, the IoT device 1a does not transmit data. Thus, the problem described above by referring to FIG. 2 can be solved. However, the IoT device 1c transmits data to the user device 2x and also transmits the data to the user device 2y. Thus, although an unnecessary data transmission is not performed, the same data could be redundantly transmitted. Accordingly, this method also has room for improvement of the use efficiency.

EMBODIMENTS

FIG. 4 illustrates an example of a network system in accordance with embodiments of the present invention. As depicted in FIG. 4, a network system 100 in accordance with embodiments of the invention includes a plurality of virtual gateways 10 (10 #1-10 #3) and a network orchestrator 20.

The virtual gateways 10 correspond to communication devices implemented in nodes in the network system 100. In this case, the communication device is implemented by, for example, a computer that includes a processor, a memory, and a communication interface. The virtual gateway 10 can execute application programs. The application programs include a program for providing a communication function and a program for processing IoT data. Processing IoT data includes analyzing, modifying, accumulating, copying, and/or deleting IoT data. The application programs may be installed in the virtual gateway 10 in advance or may be supplied from the network orchestrator 20 or a program server (not illustrated).

The network orchestrator 20 is an example of a communication control device that controls the virtual gateways 10. The network orchestrator 20 receives a request pertaining to use of IoT data from a user device 2. The network orchestrator 20 controls one or more virtual gateways 10 such that a request from a user device 2 is satisfied and the use efficiency of network resources is enhanced. Preferably, the network orchestrator 20 controls one or more virtual gateways 10 so as to optimize the use efficiency of network resources. In this case, the network orchestrator 20 may active an application program implemented in the one or more virtual gateways 10.

FIG. 5 illustrates an example of a data processing method using virtual gateways 10 and the network orchestrator 20. In this example, the IoT devices 1a-1c generate and output the same data as those in FIGS. 1-3. In particular, the IoT device 1a outputs data a at intervals of ten seconds. The IoT device 1b outputs data b at intervals of five seconds. The IoT device 1c outputs data c at intervals of five seconds.

Each of the user devices 2 transmits a request pertaining to use of IoT data to the network orchestrator 20. In particular, the user device 2x transmits a request indicating "data b generated by the IoT device 1b and data c generated by the IoT device 1c are received at intervals of ten seconds" to the network orchestrator 20. The user device 2y transmits a request indicating "data c generated by the IoT device 1c is received at intervals of ten seconds" to the network orchestrator 20.

According to these requests, the network orchestrator 20 gives instructions to the virtual gateways 10 #1 and 10 #2. The virtual gateway 10 #1 is a communication device accommodating the IoT devices 1a-1c. The virtual gateway 10 #2 is a communication device accommodating the user devices 2x and 2y. Note that one or more virtual gateways may be provided between the virtual gateways 10 #1 and 10 #2.

The virtual gateway 10 #1 is given an instruction to perform the following aggregation process.
(1) Discard data a received from the IoT device 1a.
(2) Accumulate data b received from the IoT device 1b, and forward the accumulated data b to the virtual gateway 10 #2 at intervals of ten seconds.
(3) Accumulate data c received from the IoT device 1c, and forward the accumulated data c to the virtual gateway 10 #2 at intervals of ten seconds.

In accordance with the instruction (2), data b1 and b2 accumulated during the period from time 0 to time 10 are forwarded at time 10, and data b3 and b4 accumulated during the period from time 10 to time 20 are forwarded at time 20. In accordance with the instruction (3), data c1 and c2 accumulated during the period from time 0 to time 10 are forwarded at time 10, and data c3 and c4 accumulated during the period from time 10 to time 20 are forwarded at time 20. Thus, the virtual gateway 10 #1 multiplexes and forwards the data b1, b2, c1, and c2 to the virtual gateway 10 #2 at time 10. The virtual gateway 10 #1 also multiplexes and forwards the data b3, b4, c3, and c4 to the virtual gateway 10 #2 at time 20.

The virtual gateway 10 #2 is given an instruction to perform the following distribution process.
(4) Forward the data received from the virtual gateway 10 #1 to the user device 2x.
(5) Copy the data c generated by the IoT device 1c among the data received from the virtual gateway 10 #1 and forward the obtained data to the user device 2y.

In accordance with the instruction (4), at time 10, the data b1, b2, c1, and c2 are forwarded to the user device 2x, and the data c1 and c2 are forwarded to the user device 2y. In accordance with the instruction (5), at time 20, the data b3, b4, c3, and c4 are forwarded to the user device 2x, and the data c3 and c4 are forwarded to the user device 2y.

As described above, in the case depicted in FIG. 5, unnecessary data (i.e., data a which is not requested by any of the users) is not transmitted between the virtual gateways 10 #1 and 10 #2. Hence, the use efficiency of network resources is improved in comparison with the case depicted in FIG. 2. In the case depicted in FIG. 5, the same data is not redundantly transmitted between the virtual gateways 10 #1 and 10 #2. Hence, the use efficiency of network resources is improved in comparison with the case depicted in FIG. 3.

In the case depicted in FIG. 6, the user device 2x transmits a request indicating "data b generated by the IoT device 1b and data c generated by the IoT device 1c are received at intervals of ten seconds" to the network orchestrator 20, as in the case depicted in FIG. 5. Meanwhile, the user device 2y transmits a request indicating "data a generated by the IoT device 1a and data c generated by the IoT device 1c are received at intervals of twenty seconds" to the network orchestrator 20. The operations of the IoT devices 1a-1c are the same in FIGS. 5 and 6.

In this case, the virtual gateway 10 #1 is given an instruction to perform the following aggregation process.
(1) Accumulate data a received from the IoT device 1a, and forward the accumulated data a to the virtual gateway 10 #2 at intervals of twenty seconds.
(2) Accumulate data b received from the IoT device 1b, and forward the accumulated data b to the virtual gateway 10 #2 at intervals of ten seconds.
(3) Accumulate data c received from the IoT device 1c, and forward the accumulated data c to the virtual gateway 10 #2 at intervals of ten seconds.

In accordance with the instruction (1), data a1 and a2 accumulated during the period from time 0 to time 20 are forwarded at time 20. The instructions (2) and (3) are substantially the same in FIGS. 5 and 6. Thus, the virtual gateway 10 #1 multiplexes and forwards data b1, b2, c1, and c2 to the virtual gateway 10 #2 at time 10. The virtual gateway 10 #1 also multiplexes and forwards data a1, a2, b3, b4, c3, and c4 to the virtual gateway 10 #2 at time 20.

The virtual gateway 10 #2 is given an instruction to perform the following distribution process.
(4) Accumulate the data received from the virtual gateway 10 #1 in a buffer memory.
(5) At intervals of ten seconds, read the data b generated by the IoT device 1b and the data c generated by the IoT device 1c from the buffer memory and forward the read data to the user device 2x.
(6) At intervals of twenty seconds, read the data a generated by the IoT device 1a and the data c generated by the IoT device 1c from the buffer memory and forward the read data to the user device 2y.

In accordance with the instruction (5), data b1, b2, c1, and c2 are forwarded to the user device 2x at time 10, and data b3, b4, c3, and c4 are forwarded to the user device 2x at time 20. In accordance with the instruction (6), at time 20, and data a1, a2, c1, c2, c3, and c4 are forwarded to the user device 2y.

FIG. 7 illustrates an example of the format of a data frame. A data frame transmitted in the network system 100 includes a header and one or more data sets. The header includes a source address (SA), a destination address (DA), and data count information. The data count information indicates the number of data sets stored in the data frame.

Each of the data sets includes a generator ID, data type information, a time stamp, data length information, and IoT data. The generator ID identifies an IoT device that generated the IoT data stored in the data set. The data type information indicates the type of the IoT data stored in the data set. The time stamp indicates a time at which the IoT data stored in the data set was generated (or a time at which the IoT data was transmitted). The data length information indicates the size of the IoT data stored in the data set.

For example, the data frame F1 depicted in FIG. 7 may be transmitted at time 10 from the IoT device 1a to the virtual gateway 10 #1. "10. 10. 10. 1" and "10. 10. 20. 1" respectively indicate the IP addresses of the IoT device 1a and the virtual gateway 10 #1. "1" indicates that there is one data set. "1a" identifies the IoT device 1a. "TEMPERATURE" indicates that the IoT data is temperature data. "10" indicates a time at which the IoT data was generated. "8 bits" indicates the size of the IoT data. "25" indicates a temperature measured by the IoT device 1a.

Figure 8A:
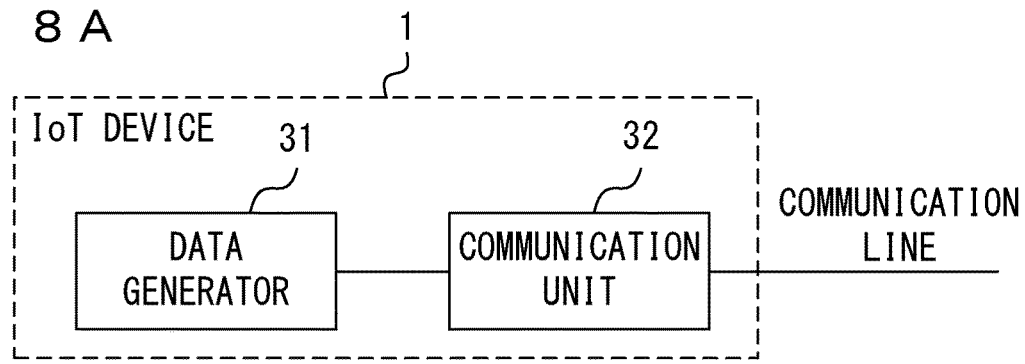
FIGS. 8A-8C illustrate examples of the functions of an IoT device, a user device, and a virtual gateway.

FIG. 8A illustrates an example of the functions of an IoT device 1. The IoT device 1 includes a data generator 31 and a communication unit 32. The IoT device 1 may have other functions that are not depicted in FIG. 8A.

The data generator 31 generates IoT data. For example, video data may be generated when the data generator 31 is a monitoring camera. Weather data may be generated when the data generator 31 is a weather sensor. The communication unit 32 provides an interface with a network. In this example, the communication unit 32 transmits IoT data generated by the data generator 31 to a virtual server 10.

Figure 8B:
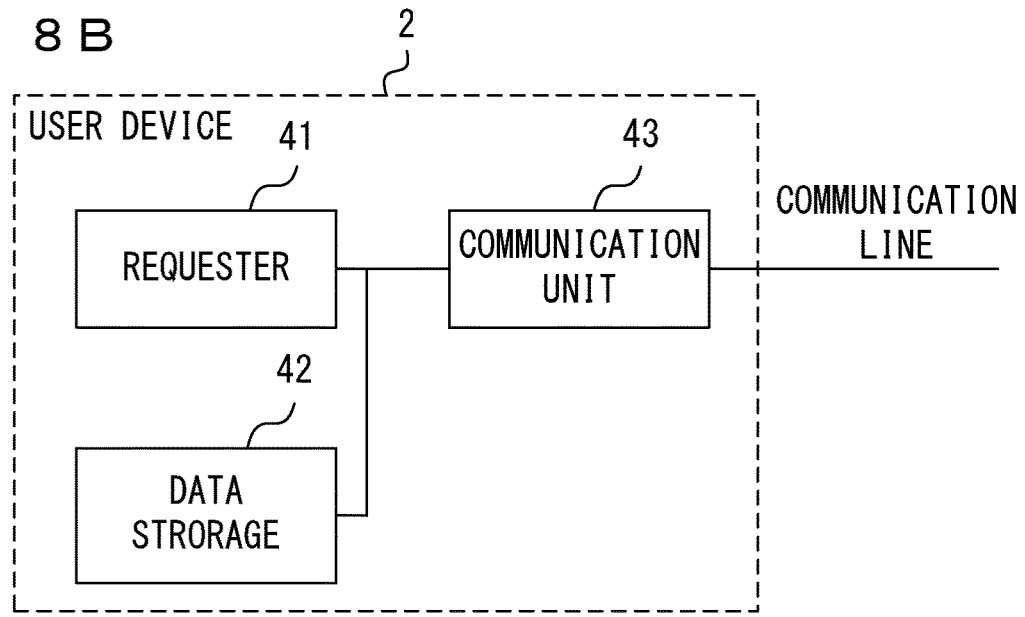

FIG. 8B illustrates an example of the functions of a user device 2. The user device 2 includes a requester 41, a data storage 42, and a communication unit 43. The user device 2 may have other functions that are not depicted in FIG. 8B.

The requester 41 generates a request pertaining to use of data. For example, this request may be generated according to an instruction from the user of the user device 2. This request includes information identifying IoT data to be acquired (or an IoT device 1 that generates the IoT data) and information indicating a reception pattern. For example, the reception pattern may indicate intervals at which the user device 2 receives data. The data storage 42 stores IoT data received over the network. The communication unit 43 provides an interface with the network. In this example, the communication unit 43 receives data generated by IoT devices 1. The communication unit 43 transmits a request generated by the requester 41 to the network orchestrator 20.

Figure 8C:
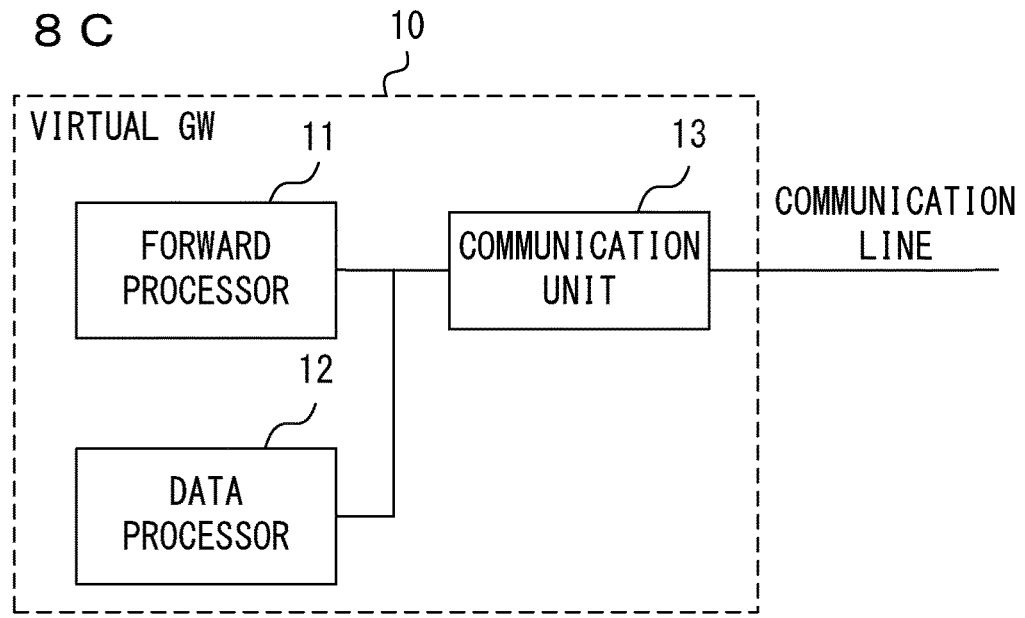

FIG. 8C illustrates an example of the functions of a virtual gateway 10. The virtual gateway 10 includes a forwarding processor 11, a data processor 12, and a communication unit 13. The virtual gateway 10 may have other functions that are not depicted in FIG. 8C.

The forwarding processor 11 forwards a packet. For example, the forwarding processor 11 may forward a received packet to a destination node according to the address in this packet. The data processor 12 performs data processing in accordance with an instruction from the network orchestrator 20. The data processing includes analyzing, modifying, accumulating, copying, or deleting IoT data. Thus, the data processor 12 is implemented by executing one or more application programs. The communication unit 13 provides an interface with the network. In this example, the communication unit 13 receives and transmits IoT data. In this case, the communication unit 13 may transmit a packet that includes IoT data processed by the data processor 12. The communication unit 13 also receives an instruction transmitted from the network orchestrator 20.

Figure 9:
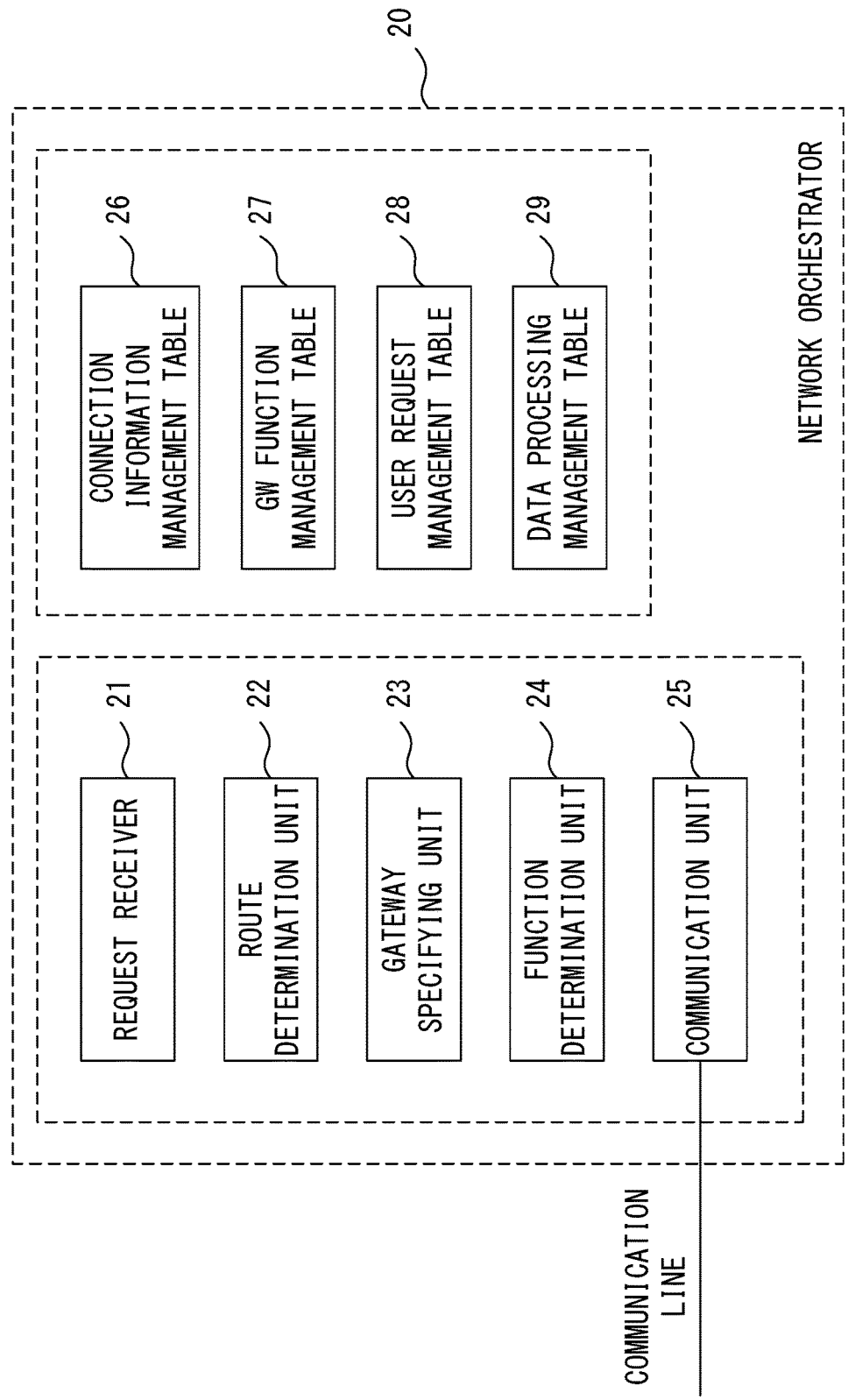
FIG. 9 illustrates examples of the functions of a network orchestrator.

FIG. 9 illustrates examples of the functions of the network orchestrator. The network orchestrator 20 includes a request receiver 21, a route determination unit 22, a gateway specifying unit 23, a function determination unit 24, and a communication unit 25. However, the network orchestrator 20 may have other functions that are not depicted in FIG. 9.

The request receiver 21 receives a request pertaining to use of data generated by an IoT device 1 from a user device 2. As described above, this request includes information identifying data designated by the user device 2 and information indicating a reception pattern.

The route determination unit 22 determines a route between the IoT device 1 pertaining to the request received by the request receiver 21 and the user device 2. The IoT device 1 pertaining to the request indicates an IoT device that generates data to be acquired by the user. The user device 2 pertaining to the request indicates the source of the request. The gateway specifying unit 23 specifies a pair of virtual gateways implemented at both ends of an overlapped route that is an overlap between a route corresponding to a certain request and a route corresponding to another request.

FIG. 10 illustrates an example of a process performed by the route determination unit 22 and the gateway specifying unit 23. In this example, the network includes nodes n1-n8. A virtual node 10 is implemented in each of the nodes n1-n8. The IoT device 1a is connected to the node n1. The user device 2x is connected to the node n5. The user device 2y is connected to the node n8. The user devices 2x and 2y respectively request data generated by the IoT device 1a.

In this case, in response to the request transmitted from the user device 2x, the route determination unit 22 determines a route for transmitting packets between the node n1 connected to the IoT device 1a and the node n5 connected to the user device 2x. In response to the request transmitted from the user device 2y, the route determination unit 22 determines a route for transmitting packets between the node n1 connected to the IoT device 1a and the node n8 connected to the user device 2y. A route between a pair of nodes is determined using a publicly known technique. For example, a method that includes selecting a route having the smallest hop counts or a method that includes selecting a route with the lowest communication cost may be used. In this example, a route from the node n1 via the node n4 to the node n5 is selected for the request transmitted from the user device 2x, and a route from the node n1 via the nodes n4 and n5 to the node n8 is selected for the request transmitted from the user device 2y.

The gateway specifying unit 23 specifies nodes implemented at both ends of an overlapped route that is an overlap between two routes selected by the route determination unit 22. In this example, the routes from the node n1 via the node n4 to the node n5 overlap each other. In this case, "n1" and "n5" are specified as nodes implemented at both ends of the overlapped route. Thus, the gateway specifying unit 23 specifies the virtual gateway implemented in the node n1 and the virtual gateway implemented in the node n5. In the examples depicted in FIGS. 5-6, the gateway specifying unit 23 specifies the virtual gateways 10 #1 and 10 #2.

According to a request received by the request receiver 21, the function determination unit 24 determines functions to be executed by a pair of virtual gateways 10 specified by the gateway specifying unit 23. In the examples depicted in FIGS. 5-6, the function determination unit 24 determines details for an aggregation function to be executed by the virtual gateway 10 #1 and determines details for a distribution function to be executed by the virtual gateway 10 #2. In this case, the function determination unit 24 determines functions to be executed by the pair of virtual gateways 10 in a manner as to enhance the use efficiency of network resources. Preferably, the function determination unit 24 determines functions to be executed by the pair of virtual gateways 10 in such a manner as to optimize the use efficiency of communication resources between the virtual gateways 10 #1 and 10 #2.

The communication unit 25 transmits an instruction that includes information identifying the functions determined by the function determination unit 24 to the pair of virtual gateways 10 specified by the gateway specifying unit 23. Upon receipt of the instruction from the network orchestrator 20, the virtual gateways 10 perform data processing based on the instruction.

In order to control virtual gateways 10, the network orchestrator 20 includes a connection information management table 26, a gateway function management table 27, a user request management table 28, and a data processing management table 29.

The connection information management table 26 stores information indicating connections between entities forming the network system 100. The entities forming the network system 100 include IoT devices 1, user devices 2, and virtual gateways 10. For example, the connection information management table 26 may be created by a network administrator in advance.

FIG. 11A indicates the connections between IoT devices 1 and virtual gateways 10 depicted in FIGS. 5-6. In this example, the IoT devices 1a-1c are connected to the virtual gateway 10 #1. The IP addresses of the entities are registered. In addition, transmission intervals are registered for the IoT devices 1.

FIG. 11B indicates the connection between a generation-side virtual gateway 10 and a user-side virtual gateway 10 depicted in FIGS. 5-6. In this example, the virtual gateways 10 #1 and 10 #2 are connected. FIG. 11C indicates the connection between virtual gateways 10 and user devices 2 depicted in FIGS. 5-6. In this example, the user devices 2x and 2y are connected to the virtual gateway 10 #2.

The gateway function management table 27 manages functions that virtual gateways 10 can provide. Each of the functions is implemented by executing an application program. Thus, the gateway function management table 27 substantially manages the application programs that the virtual gateways 10 can execute. In the example depicted in FIG. 12, the virtual gateway 10 #1 can provide an aggregation function and a motion extraction function, and the virtual gateway 10 #2 can provide a distribution function and an empty/full decision function. Note that the motion extraction function and the empty/full decision function will be described by referring to other embodiments hereinafter. For example, the gateway function management table 27 may be created by a network administrator in advance.

The user request management table 28 manages requests received from user devices 2. Each of the requests indicates information pertaining to use of data generated by an IoT device 1. In particular, as depicted in FIGS. 13A and 13B, an IoT device 1 that generates IoT data, a generation-side virtual gateway, a user-side virtual gateway, a user device 2 of a user who intends to acquire the IoT data, and a reception interval for the IoT data designated by the user are registered for each request in the user request management table 28. Note that the generation-side virtual gateway and the user-side virtual gateway are specified by the gateway specifying unit 23 described above and registered in the user request management table 28.

For example, FIG. 13A may indicate a user request management table 28 created when the data processing depicted in FIG. 5 is performed. The sources of requests 001_01 and 001_02 are the user device 2x. Request 001_01 indicates that "IoT data generated by the IoT device 1b are received at intervals of ten seconds." Request 001_02 indicates that "IoT data generated by the IoT device 1c are received at intervals of ten seconds." The source of request 002 is the user device 2y. Request 002 indicates that "IoT data generated by the IoT device 1c are received at intervals of ten seconds."

FIG. 13B indicates a user request management table 28 created when the data processing depicted in FIG. 6 is performed. The requests 001_01 and 001_02 in FIG. 13B are the same as those in FIG. 13A. The sources of requests 002_01 and 002_02 are the user device 2y. Request 002_01 indicates that "IoT data generated by the IoT device 1c are received at intervals of twenty seconds." Request 002_02 indicates that "IoT data generated by the IoT device 1a are received at intervals of twenty seconds."

The data processing management table 29 manages details of data processing to be performed by virtual gateways 10. In particular, details of data processing to be performed for IoT data generated by each IoT device 1 are registered in the data processing management table 29. Specifically, functions and parameters are designated for generation-side virtual gateways. In this case, a parameter indicates a time interval for aggregation (or multiplexing). Meanwhile, functions, forwarding destinations, and parameters are designated for user-side virtual gateways. In this case, a forwarding destination indicates a user device that issued a request. A parameter indicates a time interval for distribution (or forwarding). For example, the data processing management table 29 may be created by the function determination unit 24. In this case, the function determination unit 24 creates the data processing management table 29 by referring to the user request management table 28 depicted in FIG. 13A or 13B.

FIG. 14A indicates a data processing management table 29 created when the data processing depicted in FIG. 5 is performed. In this example, IoT data generated by the IoT device 1a is not requested. Thus, a parameter for IoT data generated by the IoT device 1a indicates "zero (discarding)". As depicted in FIG. 13A, "reception interval=10 seconds" is designated for IoT data generated by the IoT device 1b. Thus, the transmission interval for the generation-side virtual gateway is also set to "10 seconds". Similarly, "transmission interval=10 seconds" is set for IoT data generated by the IoT device 1c.

FIG. 14B indicates a data processing management table 29 created when the data processing depicted in FIG. 6 is performed. In this example, "reception interval=20 seconds" is designated for IoT data generated by the IoT device 1a, as depicted in FIG. 13B. Thus, the transmission interval for the generation-side virtual gateway is also set to "20 seconds". Meanwhile, "reception interval=10 seconds" and "reception interval=20 seconds" are designated for IoT data generated by the IoT device 1c, as depicted in FIG. 13B. In this case, a transmission interval is determined to satisfy the shorter of the reception intervals. Thus, the transmission interval for the generation-side virtual gateway is set to "10 seconds".

Figure 15:
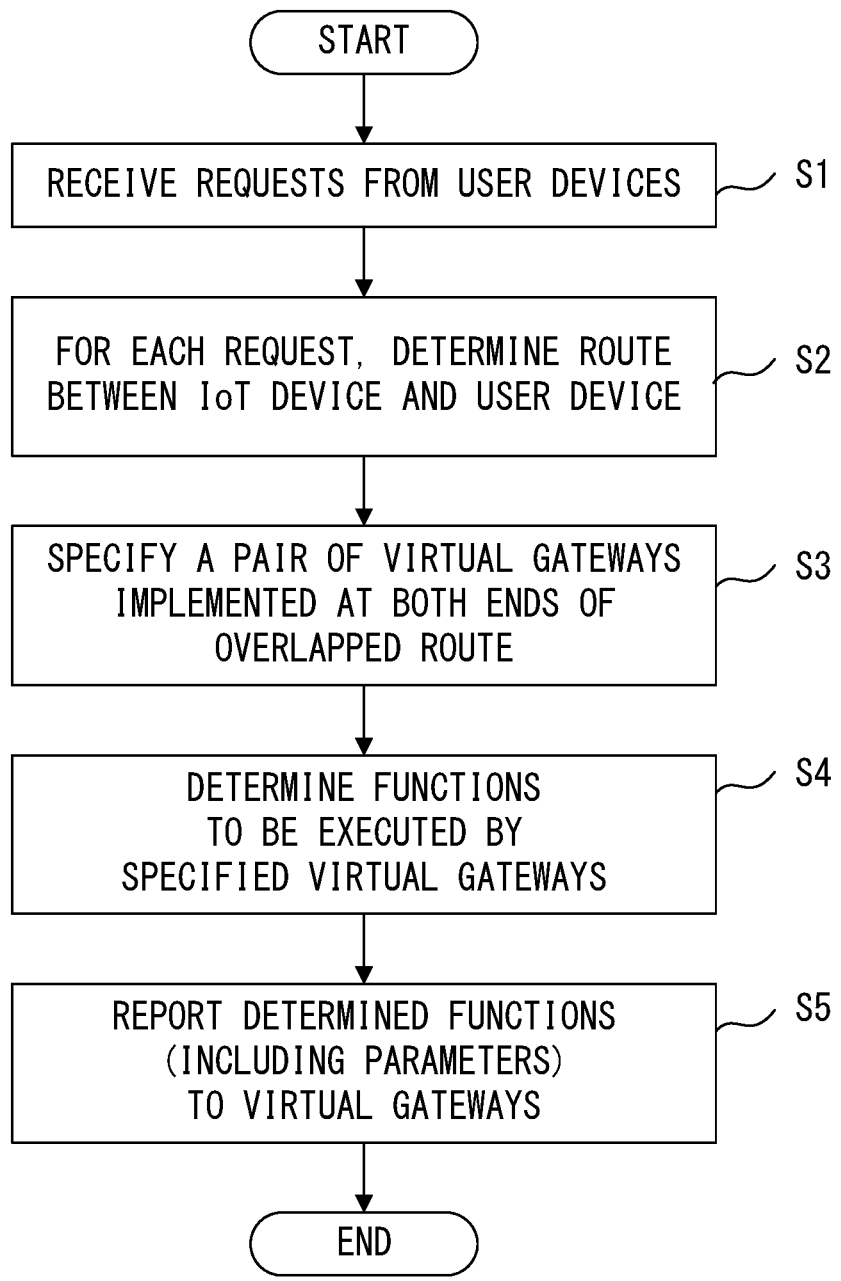
FIG. 15 is a flowchart illustrating an example of a process performed by a network orchestrator.

FIG. 15 is a flowchart illustrating an example of a process performed by the network orchestrator 20. In this example, a connection information management table 26 and a gateway function management table 27 are created in advance. Thus, for each IoT device 1 and for each user device 2, the network orchestrator 20 knows which virtual gateway the device is connected to. The network orchestrator 20 also knows functions that the virtual gateways 10 can provide.

In S1, the network orchestrator 20 receives requests pertaining to use of data generated by IoT devices 1 from user devices 2. The received requests are registered in the user request management table 28.

In S2, the network orchestrator 20 determines, for each of the requests registered in the user request management table 28, a route between an IoT device 1 and a user device 2. In particular, a route is determined for transmitting IoT data requested by the user device 2 from the IoT device 1 that generates the IoT data to the user device 2 that has requested the request. In this case, for example, a route with the smallest hop counts may be selected.

In S3, the network orchestrator 20 detects an overlapped route that is an overlap between a route corresponding to a certain request and a route corresponding to another request. In this case, an overlapped route pertaining to two or more requests is detected. In the example depicted in FIG. 5, an overlapped route pertaining to the following three requests is obtained.

Request 001_01: Transmit data b from IoT device 1b to user device 2x Request 001_02: Transmit data c from IoT device 1c to user device 2x Request 002: Transmit data b from IoT device 1c to user device 2y In the example depicted in FIG. 6, an overlapped route pertaining to the following four requests is obtained.

Request 001_01: Transmit data b from IoT device 1b to user device 2x Request 001_02: Transmit data c from IoT device 1c to user device 2x Request 002_01: Transmit data b from IoT device 1c to user device 2y Request 002_02: Transmit data a from IoT device 1a to user device 2y The network orchestrator 20 specifies a pair of virtual gateways implemented in nodes at both ends of the overlapped route. In the examples depicted in FIGS. 5-6, the virtual gateway 10 #1 is specified as a generation-side virtual gateway, and the virtual gateway 10 #2 is specified as a user-side virtual gateway.

In S4, the network orchestrator 20 determines functions to be executed by the pair of virtual gateways (and parameters to be used by the functions) in a manner such that the requests are satisfied and the use efficiency of resources in the network system 100 is enhanced. In this case, the network orchestrator 20 determines functions to be executed by the virtual gateways in a manner such that unnecessary data is not transmitted. In addition, the network orchestrator 20 determines functions to be executed by the virtual gateways 10 in a manner such that the same data is not redundantly transmitted.

In S5, the network orchestrator 20 reports the functions determined in S4 (and parameters to be used by the functions) to the virtual gateways 10. In this case, the network orchestrator 20 may transmit an instruction to activate the functions determined in S4 to the virtual gateways 10. Each of the virtual gateways 10 performs data processing in accordance with the report and/or instruction received from the network orchestrator 20.

Figure 16:
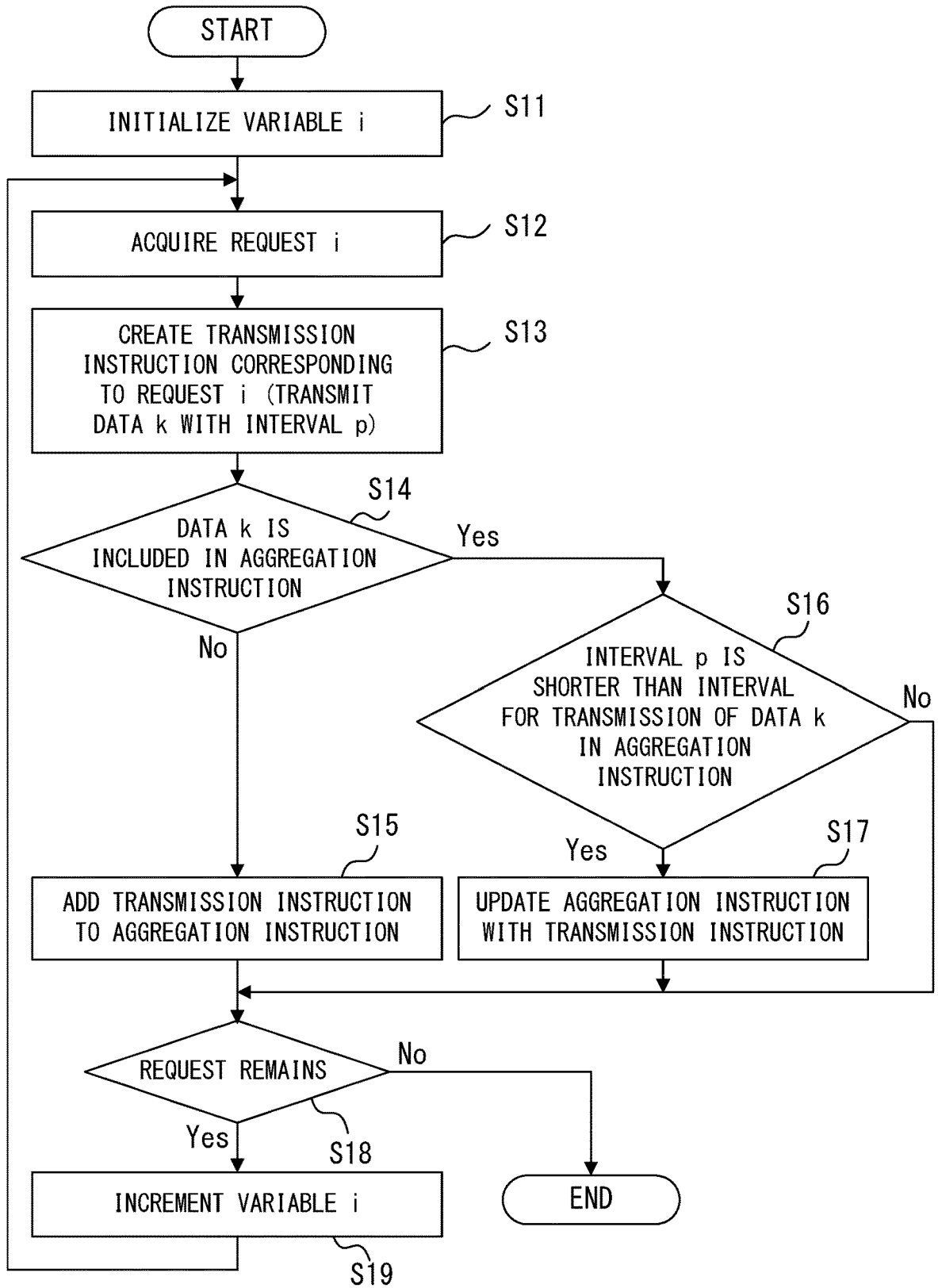
FIG. 16 is a flowchart illustrating an example of a process for generating an aggregation instruction.

FIG. 16 is a flowchart illustrating an example of a process for generating an aggregation instruction. In this example, the data processing depicted in FIG. 5 or 6 is performed. Thus, the requests depicted in FIG. 13A or 13B are registered in the network orchestrator 20. In addition, a generation-side virtual gateway and a user-side virtual gateway are specified.

In S11, the function determination unit 24 initializes a variable i. The variable i identifies a request registered in the user request management table 28. In S12, the function determination unit 24 acquires a request i from the user request management table 28.

In S13, the function determination unit 24 creates a transmission instruction corresponding to the request i. In this example, the transmission instruction indicates data k to be transmitted and a transmission interval p. The data k and the transmission interval p respectively correspond to data and a reception interval designated by a user device.

In S14, the function determination unit 24 decides whether an aggregation instruction includes an instruction pertaining to data k. When the aggregation instruction does not include an instruction pertaining to data k, the function determination unit 24 adds the transmission instruction corresponding to the request i to the aggregation instruction in S15.

When the aggregation instruction includes an instruction pertaining to data k, the function determination unit 24 compares, in S16, the transmission interval p with a transmission interval for the transmission data k in the aggregation instruction. When the transmission interval p is shorter than the transmission interval for the transmission data k in the aggregation instruction, the function determination unit 24 updates, in S17, the transmission interval in the aggregation instruction with the transmission instruction corresponding to the request i. The aggregation instruction is not updated when the transmission interval p is longer than or equal to the transmission interval for the transmission data k in the aggregation instruction.

In S18, function determination unit 24 decides whether a request for which the processes of S13-S17 have not been performed still remains in the user request management table 28. When such a request remains, the variable i is incremented in S19. Afterward, the process of the function determination unit 24 returns to S12. Accordingly, the processes of S13-S17 are performed for each of the requests registered in the user request management table 28. As a result, an aggregation instruction is created. The created aggregation instruction is transmitted to the generation-side virtual gateway.

As an example, the user request management table 28 depicted in FIG. 13B may be created. In this case, first, the following transmission instruction is created according to request 001_01.
Transmission instruction 1: "Data b, Interval=10"
When the first request is processed, an aggregation instruction is the same as the transmission instruction. Thus, the following aggregation instruction is obtained. Aggregation instruction: "Data b, Interval=10"

Next, the following transmission instruction is created according to request 001_02.
Transmission instruction 2: "Data c, Interval=10"
Data c is not included in the aggregation instruction. In this case, the transmission instruction 2 is added to the aggregation instruction. As a result, the following aggregation instruction is obtained.
Aggregation instruction: "Data b, Interval=10" and "Data c, Interval 10"

The following transmission instruction is created according to request 002_01.
Transmission instruction 3: "Data c, Interval=20"
Data c is included in the aggregation instruction (S14: Yes). However, the transmission interval for data c in the aggregation instruction is "10", while the transmission interval for data c according to the transmission instruction 3 is "20". Thus, the interval in the transmission instruction 3 is equal to or longer than the interval in the aggregation instruction (S16: No). Accordingly, the aggregation instruction is not updated.

The following transmission instruction is created according to request 002_02.
Transmission instruction 4: "Data a, Interval=20"
Data a is not included in the aggregation instruction. In this case, the transmission instruction 4 is added to the aggregation instruction. As a result, the following aggregation instruction is obtained.
Aggregation instruction: "Data b, Interval=10", "Data c, Interval=10", and "Data a, Interval=20"

The aggregation instruction created in this way is transmitted to the generation-side virtual gateway. In response to this, the virtual gateway 10 #1 performs the process depicted in FIG. 6.

A distribution instruction is created for each of the requests registered in the user request management table 28. For example, when the user request management table 28 depicted in FIG. 13B is prepared, distribution instructions, including the following four instructions, may be created.
"Data b, Reading interval 10, Destination: $2x$"
"Data c, Reading interval 10, Destination: $2x$"
"Data c, Reading interval 20, Destination: $2y$"
"Data a, Reading interval 20, Destination: $2y$"
The distribution instructions are transmitted to the user-side virtual gateway. The user-side virtual gateway stores IoT data received from the generation-side virtual gateway in a buffer memory. In accordance with the distribution instructions, the user-side virtual gateway reads data from the buffer memory and transmits the data to corresponding destinations.

Figure 18:
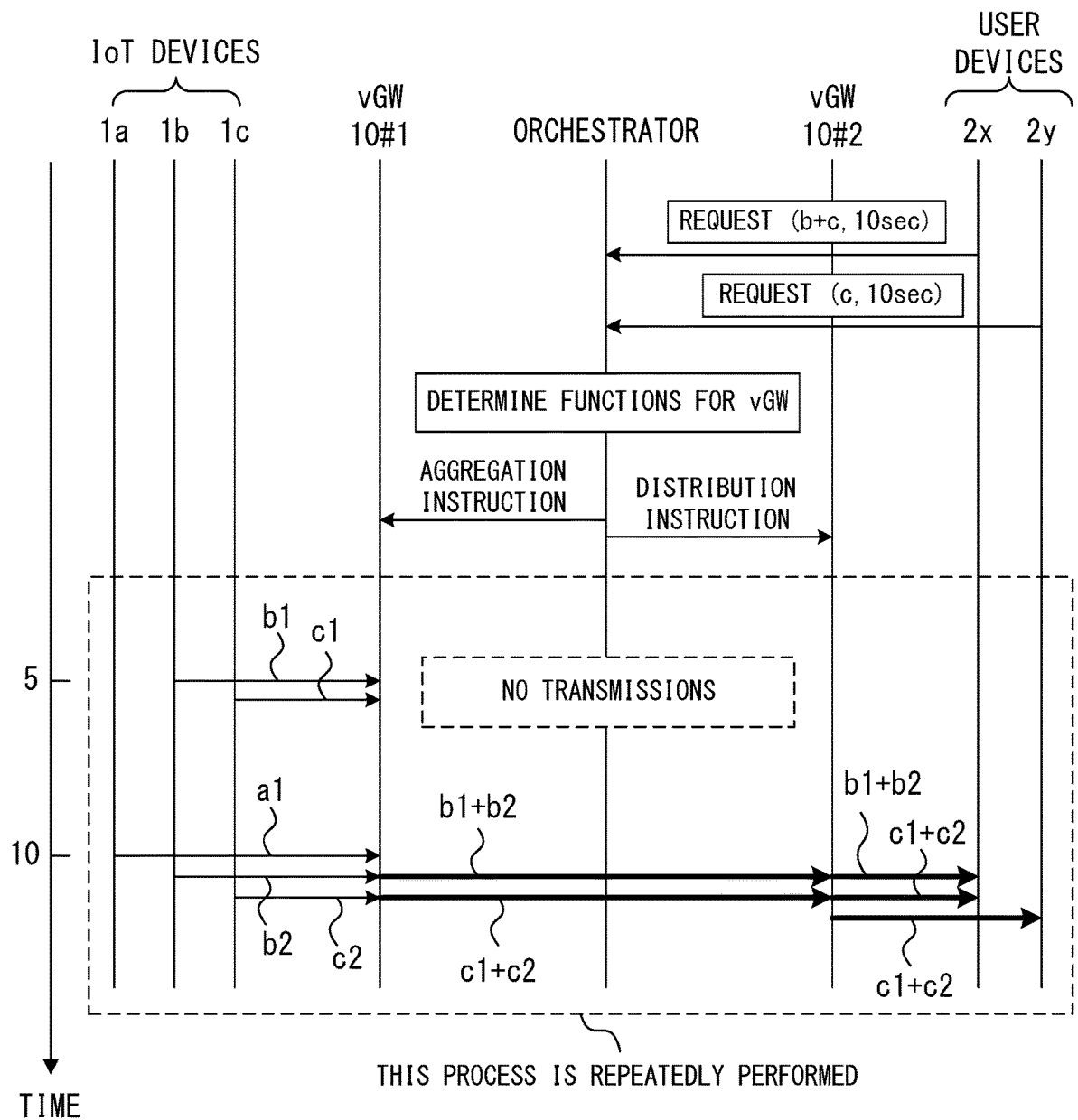
FIG. 18 illustrates an example of a sequence for data processing depicted in FIG. 5.
Figure 19:
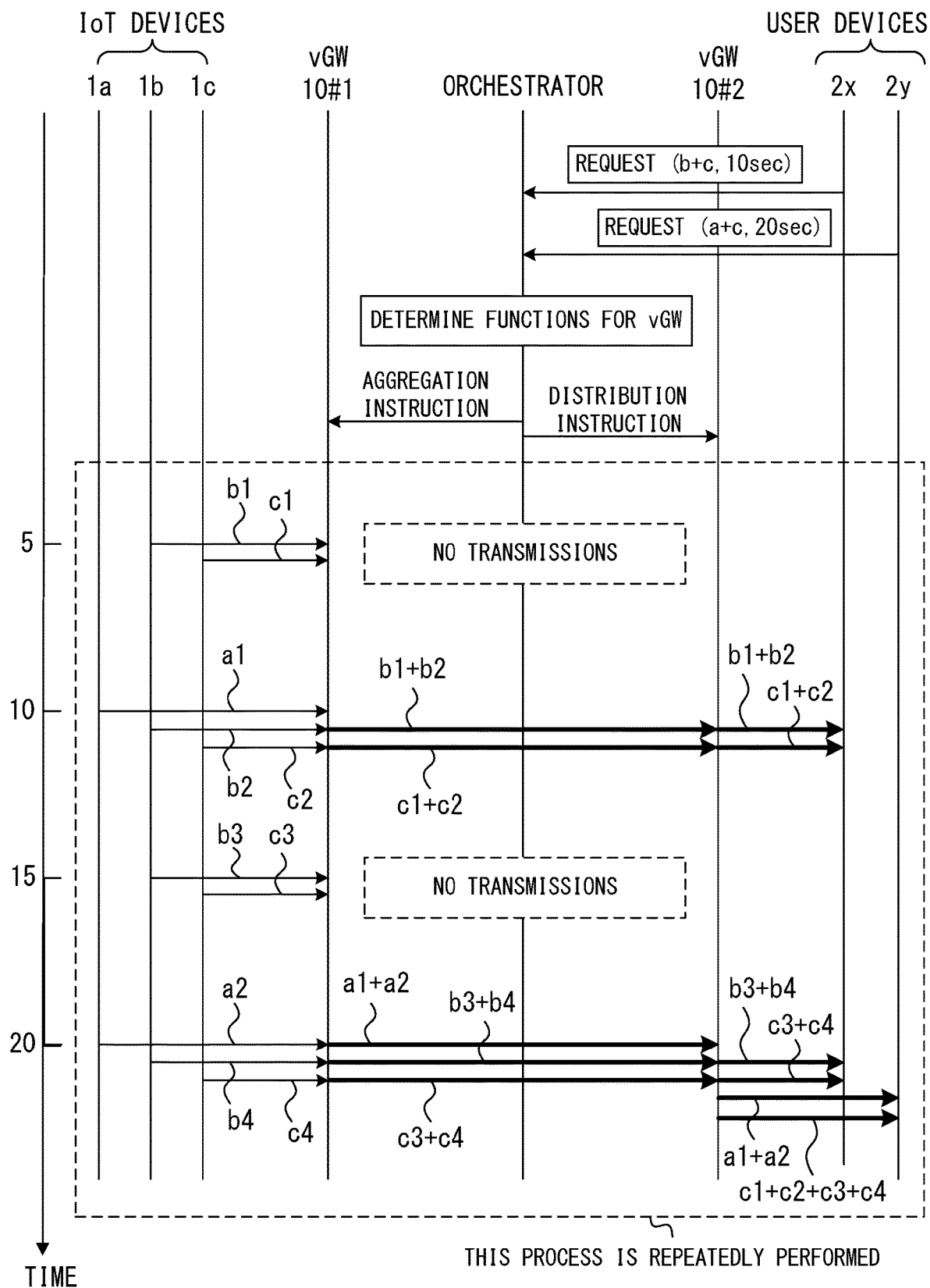
FIG. 19 illustrates an example of a sequence for data processing depicted in FIG. 6.

FIGS. 17-19 illustrate effects of embodiments of the present invention. The sequence depicted in FIG. 17 corresponds to the data transmission illustrated in FIG. 1. For example, in the sequence depicted in FIG. 17, IoT data generated by each IoT device may be transmitted from the router 3 #1 to the router 3 #2, irrespective of whether the IoT data is requested by a user. Thus, not only the requested data but unnecessary data is transmitted between the routers 3 #1 and 3 #2. Each of the IoT devices 1 transmits the same data to the user devices 2. That is, IoT data is redundantly transmitted. Hence, the use efficiency of resources is low.

The sequence depicted in FIG. 18 corresponds to the data transmission illustrated in FIG. 5. In this case, according to requests received from user devices, the network orchestrator 20 sets functions for the virtual gateways 10 such that the requests are satisfied and the use efficiency of resources is enhanced. In this example, none of the users request data a generated by the IoT device 1a. In this case, the network orchestrator 20 does not give the virtual gateway 10 #1 an instruction indicating that data a is to be transmitted. Thus, unnecessary data is not transmitted between the virtual gateways 10 #1 and 10 #2. Meanwhile, reception intervals designated by the user devices are ten seconds. Accordingly, pieces of IoT data generated at intervals of five seconds (data generated by the IoT devices 1b and 1c) are stored in a buffer memory in the virtual gateway 10 #1 and transmitted together at intervals of ten seconds. As a result, the number of data transmissions is decreased. In addition, when a plurality of user devices request the same data, this data is not repeatedly transmitted but is transmitted only once. Hence, the use efficiency of resources is high.

The sequence depicted in FIG. 19 corresponds to the data transmission illustrated in FIG. 6. Also in this case, according to requests received from user devices, the network orchestrator 20 configures functions for the virtual gateways 10 such that the requests are satisfied and the use efficiency of resources is enhanced. In this example, redundant data transmissions are also not performed, thereby enhancing the use efficiency of resources.

Second Embodiment

Figure 20:
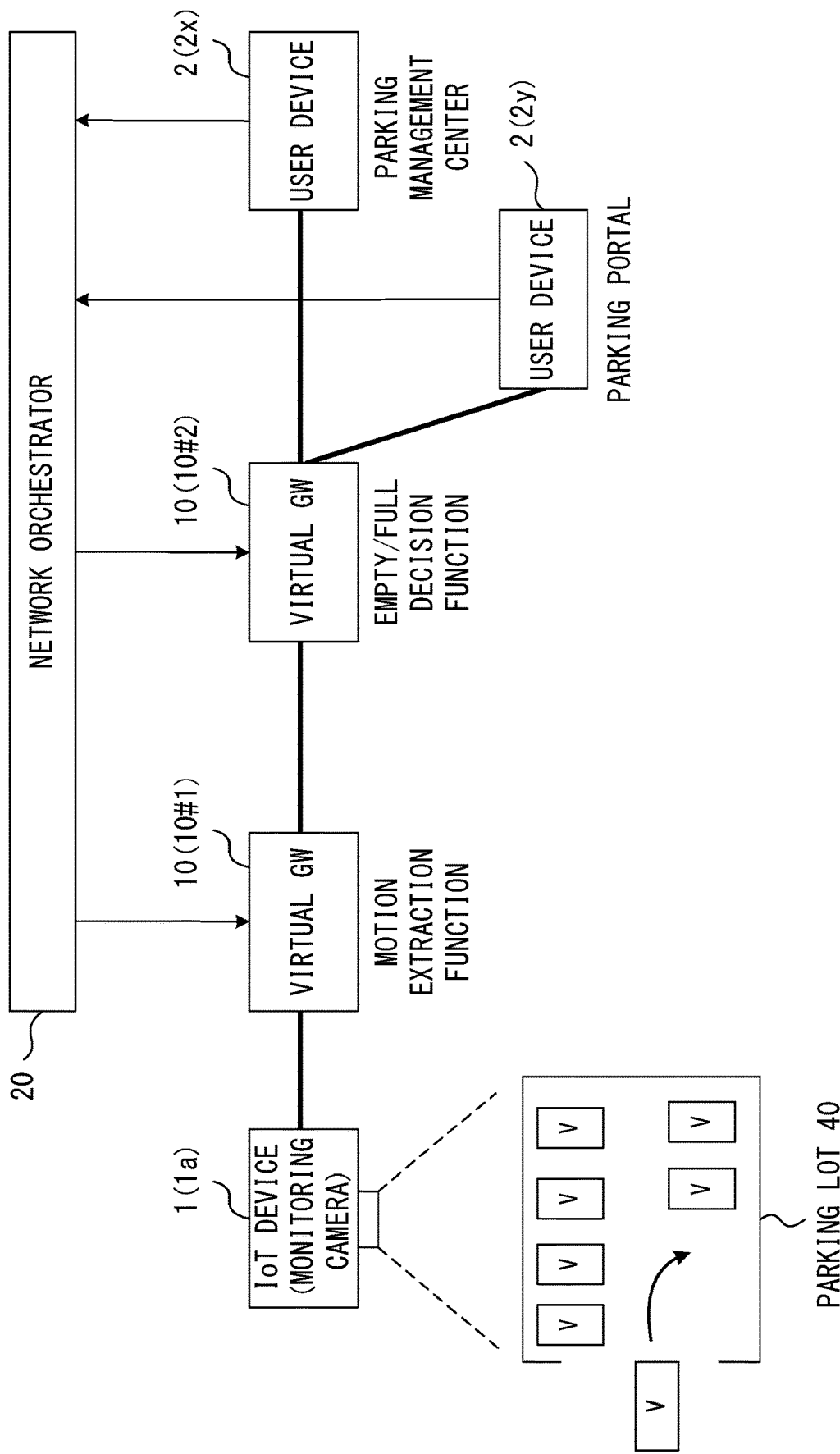
FIG. 20 illustrates an example of a method for processing IoT data in a second embodiment.

FIG. 20 illustrates an example of a method for processing IoT data in a second embodiment. In this example, the IoT device 1a is a monitoring camera installed in a parking lot 40. The IoT device 1a outputs video data obtained by imaging the parking lot 40. The IoT device 1a is connected to the virtual gateway 10 #1.

The user device 2x manages the situation of the parking lot 40 by using video data output from the IoT device 1a. However, all video data is not necessarily needed to manage the situation of the parking lot 40. Thus, the user device 2x can manage the situation of the parking lot 40 by acquiring video data only when the state of the parking lot 40 is changed. Accordingly, the user device 2x requests only video data that includes a "motion" in the video data output from the IoT device 1a. In particular, the request transmitted from the user device 2x to the network orchestrator 20 includes information identifying the IoT device 1a and information indicating that only video data that includes a "motion" is needed.

The user device 2y creates and makes available to the public empty/full information indicating whether there is an "empty space" in the parking lot 40. The empty/full information can be created by analyzing video data output from the IoT device 1a. Thus, the request transmitted from the user device 2y to the network orchestrator 20 includes information identifying the IoT device 1a and information indicating that the empty/full information of the parking lot 40 is needed.

The network orchestrator 20 registers requests received from the user devices 2x and 2y in the user request management table 28. The gateway specifying unit 23 specifies a generation-side virtual gateway and a user-side virtual gateway corresponding to the requests. In this example, the virtual gateways 10 #1 and 10 #2 are respectively specified as the generation-side virtual gateway and the user-side virtual gateway. According to the requests received from the user devices 2x and 2y, the function determination unit 24 determines functions to be executed by the virtual gateways 10 #1 and 10 #2.

In this example, the user request management table 28 depicted in FIG. 21A is created. Request 001 indicates that video data including a "motion" is to be acquired from video data output from the IoT device 1a. Request 002 indicates that the empty/full information of the parking lot 40 is to be acquired according to video data output from the IoT device 1a.

In this case, the generation-side virtual gateway may extract video data including a "motion" from the video data acquired by the IoT device 1a, thereby decreasing the amount of information in data transmitted between the virtual gateways 10 #1 and 10 #2. Accordingly, the network orchestrator 20 transmits, to the virtual gateway 10 #1, an instruction that includes information identifying the IoT device 1a and information identifying a motion extraction function (a function for extracting video data including a "motion").

The empty/full information of the parking lot 40 can be created from video data acquired by the IoT device 1a. However, the empty/full state of the parking lot 40 will not change when video data acquired by the IoT device 1a does not include a "motion". Accordingly, to decrease the amount of processing performed by the processor when creating empty/full information, only video data for a time slot with a "motion", not all video data, will preferably be used to create empty/full information for the parking lot 40. In addition, when empty/full information is created by the generation-side virtual gateway (i.e., virtual gateway 10 #1), this empty/full information will be transmitted from the virtual gateway 10 #1 to the virtual gateway 10 #2. Thus, in order to decrease the amount of information in data transmitted between the virtual gateways 10 #1 and 10 #2, empty/full information will preferably be created by the virtual gateway 10 #2, rather than by the virtual gateway 10 #1. Accordingly, the network orchestrator 20 transmits, to the virtual gateway 10 #2, an instruction that includes information identifying the IoT device 1a and information identifying the empty/full decision function (a function for deciding whether there is an "empty space" in the parking lot 40).

Instructions transmitted to virtual gateways 10 are registered in the data processing management table 29, as depicted in FIG. 21B. In this example, motion extraction is performed by the generation-side virtual gateway. The user-side virtual gateway creates empty/full information.

The virtual gateway 10 #1 performs data processing in accordance with an instruction from the network orchestrator 20. In particular, the virtual gateway 10 #1 extracts video data including a "motion" from video data output from the IoT device 1a. The virtual gateway 10 #1 transmits only the video data including a "motion" to the virtual gateway 10 #.

The virtual gateway 10 #2 also performs data processing in accordance with an instruction from the network orchestrator 20. In particular, when receiving the video data including a "motion", the virtual gateway 10 #2 forwards this video data to the user device 2x. In addition, the virtual gateway 10 #2 decides whether there is an "empty space" in the parking lot 40 according to the video data. The virtual gateway 10 #2 transmits the decision result to the user device 2y.

The result of empty/full decision is stored in the data frame F2 depicted in FIG. 7 and transmitted from the virtual gateway 10 #2 to the user device 2y. "10. 10. 30. 1" and "10. 10. 40. 2" respectively indicate the IP addresses of the virtual gateway 10 #2 and the user device 2y. "1" indicates that there is one data set. "1a" identifies the IoT device 1a. "EMPTY/FULL" indicates that data stored in the data set is empty/full information. "60" indicates a time at which the empty/full information was generated. "48 bits" indicates the data size. "EMPTY→FULL" indicates that the parking lot 40 has been shifted from an empty state to a full state.

Figure 22:
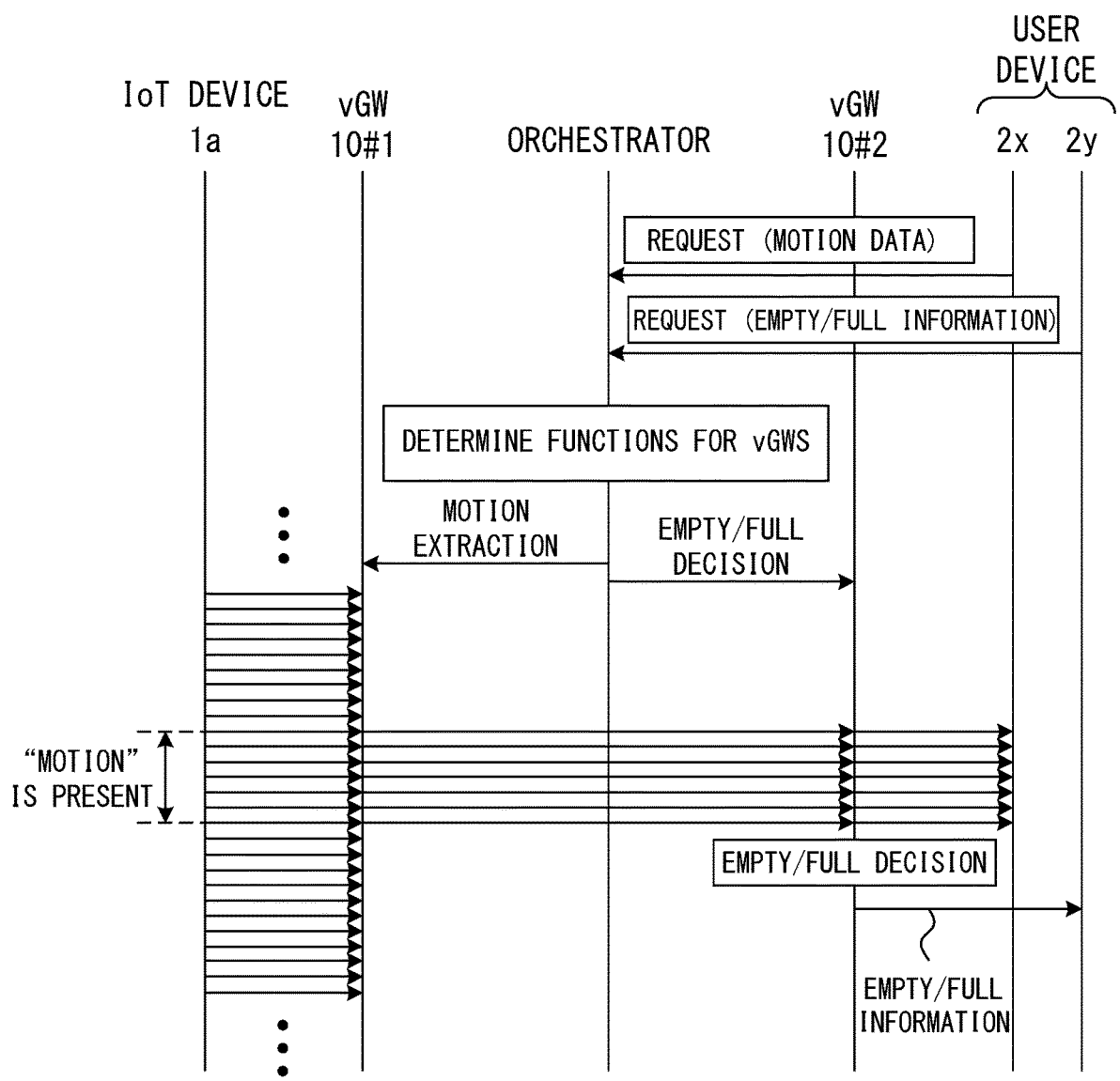
FIG. 22 illustrates an example of a sequence for data processing depicted in FIG. 20.

FIG. 22 illustrates an example of a sequence for the data processing depicted in FIG. 20. According to requests received from user devices, the network orchestrator 20 configures functions for the virtual gateways 10 such that the requests are satisfied and the use efficiency of resources is enhanced. In this example, the network orchestrator 20 activates the motion extraction function of the virtual gateway 10 #1 and the empty/full decision function of the virtual gateway 10 #2.

In this case, the virtual gateway 10 #1 transmits only video data including a "motion" to the virtual gateway 10 #2. Thus, the amount of information in data transmitted between the virtual gateways 10 #1 and 10 #2 is decreased. The virtual gateway 10 #2 forwards the video data received from the virtual gateway 10 #1 to the user device 2x. The virtual gateway 10 #2 decides whether there is an "empty space" in the parking lot 40 according to the video data received from the virtual gateway 10 #1. The decision result is transmitted to the user device 2y.

Hardware Configuration

Figure 23:
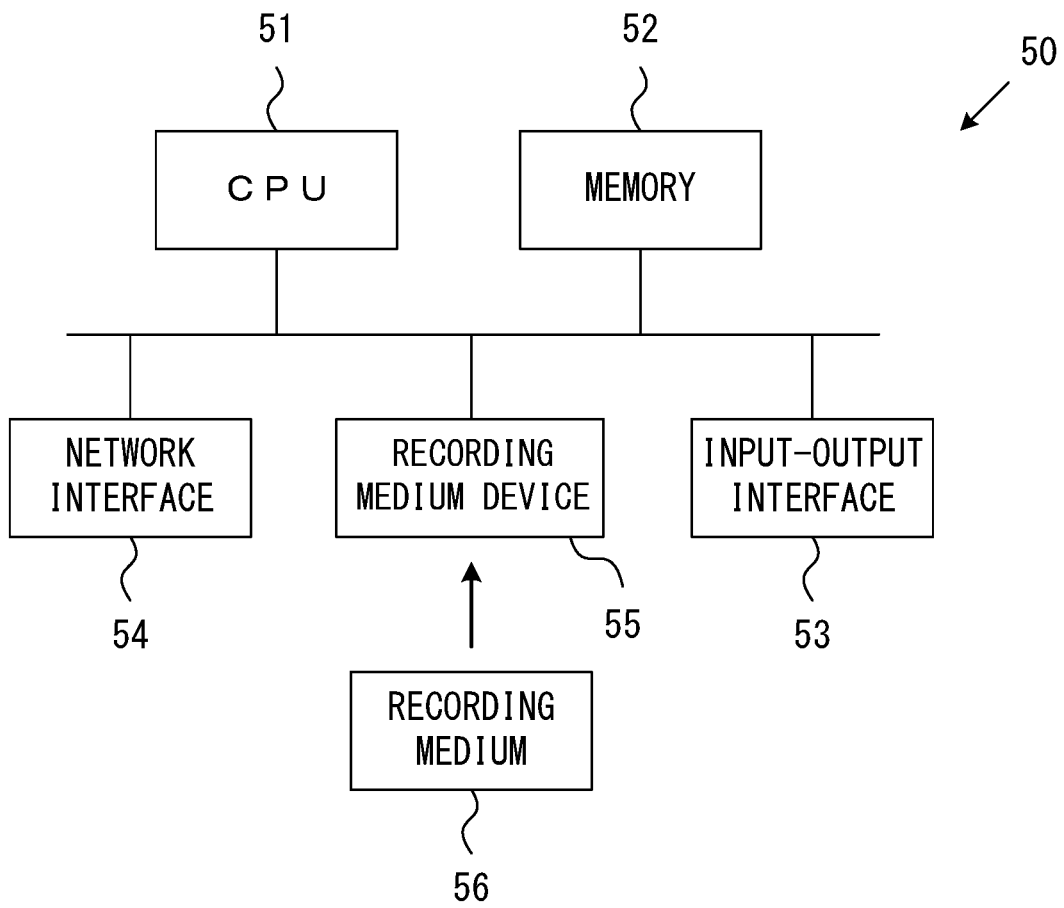
FIG. 23 illustrates an example of the hardware configuration of a virtual gateway, a network orchestrator, or a user device.

FIG. 23 illustrates an example of the hardware configuration of a virtual gateway 10, a network orchestrator 20, or a user device 2. In this example, the virtual gateway 10, the network orchestrator 20, and the user device 2 are implemented by the computer system 50 depicted in FIG. 23 and have substantially the same hardware configurations. However, CPU capabilities and memory capacities do not need to be equal.

The computer system 50 includes a CPU 51, a memory 52, an input-output interface 53, a network interface 54, and a recording medium device 55. The computer system 50 may include other devices that are not depicted in FIG. 23.

The CPU 51 can provide desired functions by executing a given program. For example, in the virtual gateway 10, the CPU 51 may execute a program for extracting video data including a "motion" or a program for analyzing video data. In the network orchestrator 20, the CPU 51 executes a program for providing the functions of the request receiver 21, the route determination unit 22, the gateway specifying unit 23, the function determination unit 24, and the communication unit 25. However, the request receiver 21 may receive information and/or data in accordance with an instruction from the CPU 51. The communication unit 25 may transmit information and/or data in accordance with an instruction from the CPU 51. That is, the request receiver 21 and/or the communication unit 25 may be implemented by a hardware circuit.

A program to be executed by the CPU 51 may be supplied from a removable recording medium 56 to the computer system 50. Alternatively, a program to be executed by the CPU 51 may be stored in the memory 52 in advance, may be stored in a storage device connected to the computer system 50, or may be stored in a program server (not illustrated).

For example, the memory 52 may be a semiconductor memory and store data and information to be used by the computer system 50. In the network orchestrator 20, the connection information management table 26, the gateway function management table 27, the user request management table 28, and the data processing management table 29 are stored in, for example, the memory 52. The memory 52 is also used as a work area for the CPU 51.

For example, the input-output interface 53 may provide an interface for connecting to a keyboard, a mouse, a display, or a storage device. The network interface 54 provides an interface for connecting to a network. The recording medium device 55 can acquire data or information recorded in the removable recording medium 56. The removable recording medium 56 is implemented by, for example, a semiconductor memory, a medium that stores information by means of an optical effect, or a medium that stores information by means of a magnetic effect.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A network system that processes data generated by a data generation device, the network system including a plurality of communication devices and a communication control device that controls the plurality of communication devices, wherein
   the communication control device includes:
      a receiver configured to receive a request pertaining to use of data generated by the data generation device from a user device;
      a processor configured to
         determine a route between the data generation device pertaining to the request received by the receiver and the user device,
         specify a first communication device and a second communication device that are implemented at both ends of an overlapped route that is an overlap between a first route corresponding to a first request received by the receiver and a second route corresponding to a second request received by the receiver, and
         determine, based on the first request and the second request, a function to be executed by at least one of the first communication device and the second communication device for data transmitted from the data generation device to the user device; and
      a transmitter configured to transmit an instruction including information for identifying the function determined by the processor to at least one of the first communication device and the second communication device, and
   at least one of the first communication device and the second communication device processes data corresponding to the first request and the second request based on the instruction.

2. The network system according to claim 1, wherein
   when the first communication device has received first data and second data from the data generation device, the first request indicates that the first data is to be received with a first time interval, and the second request indicates that the second data is to be received with the first time interval, the processor generates an instruction that includes information for identifying a function for multiplexing and transmitting the first data and the second data to the second communication device with the first time interval, and the transmitter transmits the instruction generated by the processor to the first communication device.

3. The network system according to claim 1, wherein when the first communication device has received first data from the data generation device, the first request indicates that the first data is to be received with a first time interval, and the second request indicates that the first data is to be received with a second time interval that is shorter than the first time interval, the processor generates an instruction that includes information for identifying a function for transmitting the first data to the second communication device with the second time interval, and the transmitter transmits the instruction generated by the processor to the first communication device.

4. The network system according to claim 1, wherein when the first communication device has received video data from the data generation device and the first request indicates that video data satisfying a specified condition is to be received, the processor generates an instruction that includes information for identifying a function for extracting video data satisfying the condition from the received video data and transmitting the extracted video data to the second communication device, and the transmitter transmits the instruction generated by the processor to the first communication device.

5. The network system according to claim 4, wherein when the second request includes information indicating that a specified analysis is to be performed for video data extracted by the first communication device, the processor generates an instruction that includes information for identifying a function for performing the analysis for video data extracted by the first communication device, and the transmitter transmits the instruction generated by the processor to the first communication device or the second communication device.

6. A communication control device that controls a plurality of communication devices in a network system, the communication control device comprising:
a receiver configured to receive a request pertaining to use of data generated by the data generation device from a user device;
a processor configured to
determine a route between the data generation device pertaining to the request received by the receiver and the user device,
specify a first communication device and a second communication device that are implemented at both ends of an overlapped route that is an overlap between a first route corresponding to a first request received by the receiver and a second route corresponding to a second request received by the receiver, and
determine, based on the first request and the second request, a function to be executed by at least one of the first communication device and the second communication device for data transmitted from the data generation device to the user device; and
a transmitter configured to transmit an instruction including information for identifying the function determined by the processor to at least one of the first communication device and the second communication device.

7. A communication control method for processing data generated by a data generation device in a network system including a plurality of communication devices and a communication control device that controls the plurality of communication devices, the communication control method comprising:
receiving a request pertaining to use of data generated by the data generation device from a user device by using a receiver;
determining a route between the data generation device pertaining to the request received by using the receiver and the user device;
specifying a first communication device and a second communication device that are implemented at both ends of an overlapped route that is an overlap between a first route corresponding to a first request received by using the receiver and a second route corresponding to a second request received by using the receiver;
determining, based on the first request and the second request, a function to be executed by at least one of the first communication device and the second communication device for data transmitted from the data generation device to the user device; and
transmitting an instruction including information for identifying the determined function to at least one of the first communication device and the second communication device, wherein
at least one of the first communication device and the second communication device processes data corresponding to the first request and the second request based on the instruction.

* * * * *